(12) United States Patent
Inagaki et al.

(10) Patent No.: US 10,352,312 B2
(45) Date of Patent: Jul. 16, 2019

(54) HERMETIC COMPRESSOR AND REFRIGERATOR

(71) Applicant: PANASONIC APPLIANCES REFRIGERATION DEVICES SINGAPORE, Singapore (SG)

(72) Inventors: Ko Inagaki, Shiga (JP); Masanori Kobayashi, Shiga (JP); Yu Haraki, Osaka (JP); Yoshinori Ishida, Kyoto (JP)

(73) Assignee: PANASONIC APPLIANCES REFRIGERATION DEVICES SINGAPORE, Singapore (SG)

( * ) Notice: Subject to any disclaimer, the term of this patent is extended or adjusted under 35 U.S.C. 154(b) by 448 days.

(21) Appl. No.: 14/655,663

(22) PCT Filed: Jan. 20, 2014

(86) PCT No.: PCT/JP2014/000256
§ 371 (c)(1),
(2) Date: Jun. 25, 2015

(87) PCT Pub. No.: WO2014/115530
PCT Pub. Date: Jul. 31, 2014

(65) Prior Publication Data
US 2015/0354552 A1 Dec. 10, 2015

(30) Foreign Application Priority Data
Jan. 22, 2013 (JP) .................................. 2013-009002

(51) Int. Cl.
*F04B 39/00* (2006.01)
*F04B 39/02* (2006.01)
(Continued)

(52) U.S. Cl.
CPC ...... *F04B 39/0005* (2013.01); *F04B 39/0022* (2013.01); *F04B 39/023* (2013.01);
(Continued)

(58) Field of Classification Search
CPC .............. F04B 39/0246; F04B 39/0005; F04B 39/0238; F04B 35/04; F04B 53/14;
(Continued)

(56) References Cited

U.S. PATENT DOCUMENTS

D286,781 S * 11/1986 Collyear ......................... D15/5
5,192,433 A * 3/1993 Shalon ................. B01D 15/206
141/80
(Continued)

FOREIGN PATENT DOCUMENTS

CN 1444698 9/2003
CN 1771394 5/2006
(Continued)

OTHER PUBLICATIONS

Extended European Search Report issued in corresponding European Application, dated Jun. 2, 2016, 9 pages.
(Continued)

*Primary Examiner* — Peter J Bertheaud
(74) *Attorney, Agent, or Firm* — Hamre, Schumann, Mueller & Larson, P.C.

(57) ABSTRACT

A hermetic compressor (100) includes an electric element (110), a compression element (112), and a hermetic container (102). The compression element includes a shaft (118), a cylinder block (124), a piston (136), a connection section (144), and an oil supply mechanism (130). The piston has a columnar seal section (160) in sliding contact with an inner peripheral face of the cylinder, two extension sections (162) that have circular arc faces each having the same radius as a radius of the seal section and extend from (Continued)

the seal section to the bottom dead center side in the axial direction with a circumferential gap therebetween, and a columnar capture section (164) that extends further toward the bottom dead center side than the extension section and has a smaller radius than the radius of the seal section.

16 Claims, 13 Drawing Sheets

(51) Int. Cl.
    *F04B 53/14*    (2006.01)
    *F04B 35/04*    (2006.01)
    *F16J 1/08*     (2006.01)
    *F25B 1/02*     (2006.01)

(52) U.S. Cl.
    CPC .............. *F04B 53/14* (2013.01); *F04B 35/04* (2013.01); *F04B 39/0238* (2013.01); *F04B 39/0246* (2013.01); *F16J 1/08* (2013.01); *F25B 1/02* (2013.01); *F25B 2500/13* (2013.01); *F25B 2600/021* (2013.01); *Y02B 30/741* (2013.01)

(58) Field of Classification Search
    CPC .... F04B 39/0022; F04B 39/12; F04B 39/023; F25B 1/02; F25B 2600/021; F25B 2500/13; Y02B 30/741
    USPC ............................................. 417/415; 92/179
    See application file for complete search history.

(56) References Cited

U.S. PATENT DOCUMENTS

| | | | | |
|---|---|---|---|---|
| 5,839,351 | A * | 11/1998 | Nakada | F02F 3/00 123/193.6 |
| 5,971,724 | A * | 10/1999 | Choi | F04B 39/023 184/6.6 |
| 6,928,921 | B2 * | 8/2005 | Brabek | F04B 39/0005 92/158 |
| D739,440 | S * | 9/2015 | Cornett | D15/7 |
| 2004/0025686 | A1 * | 2/2004 | Brabeck | F04B 39/0005 92/158 |
| 2004/0253131 | A1 * | 12/2004 | Park | F04B 39/0005 417/490 |
| 2006/0257274 | A1 * | 11/2006 | Umeoka | F04B 39/0005 417/415 |
| 2008/0159890 | A1 | 7/2008 | Miyazaki et al. | |
| 2009/0101442 | A1 * | 4/2009 | Katayama | F04B 39/0005 184/6.16 |
| 2010/0074781 | A1 | 3/2010 | Miyazaki et al. | |
| 2010/0300142 | A1 | 12/2010 | Katayama | |
| 2011/0027111 | A1 | 2/2011 | Inagaki et al. | |
| 2012/0164012 | A1 | 6/2012 | Miyazaki et al. | |
| 2012/0183419 | A1 | 7/2012 | Kobayashi | |
| 2013/0230420 | A1 | 9/2013 | Inagaki et al. | |
| 2013/0243632 | A1 | 9/2013 | Miyazaki et al. | |
| 2013/0243633 | A1 | 9/2013 | Miyazaki et al. | |
| 2014/0000451 | A1 | 1/2014 | Hikichi et al. | |
| 2014/0003984 | A1 | 1/2014 | Miyazaki et al. | |
| 2014/0105771 | A1 | 4/2014 | Miyazaki et al. | |
| 2014/0105772 | A1 | 4/2014 | Miyazaki et al. | |
| 2014/0308140 | A1 | 10/2014 | Inagaki et al. | |

FOREIGN PATENT DOCUMENTS

| | | |
|---|---|---|
| CN | 1779258 | 5/2006 |
| CN | 101010548 | 8/2007 |
| CN | 201461324 U | 5/2010 |
| CN | 101900099 | 12/2010 |
| JP | 2006-169998 | 6/2006 |
| JP | 2009-197684 | 9/2009 |
| JP | 2009-215894 | 9/2009 |
| JP | 2011-509365 | 3/2011 |
| WO | 2011/052195 | 5/2011 |
| WO | 2012/120900 | 9/2012 |

OTHER PUBLICATIONS

International Search Report, dated Feb. 18, 2014; PCT/JP2014/000256.

Office Action issued in Chinese Patent Application No. 201480003667.5, dated Apr. 26, 2016, 16 pages with a partial English translation.

\* cited by examiner

HERMETIC COMPRESSOR AND REFRIGERATOR

TECHNICAL FIELD

The present invention relates to a hermetic compressor and a refrigerator in which a piston reciprocates in inner space of a cylinder.

BACKGROUND ART

To save energy, for example, PTL 1 proposes a hermetic compressor. In the hermetic compressor, a cylinder is provided with a columnar cylinder chamber. An oil supply hole is formed in an upper wall of the cylinder, and communicates the inside and outside of the cylinder chamber with each other. An annular groove is formed in an outer peripheral face of a columnar piston.

In such a hermetic compressor, the piston reciprocates in the cylinder chamber. When the piston is located at the bottom dead center, the oil supply hole communicates with an annular groove. When the piston is located at the top dead center, the oil supply hole communicates with the cylinder chamber. Thus, lubricating oil passes through the oil supply hole, and fills a gap between the outer peripheral face of the piston and the inner peripheral face of the cylinder chamber. This lubricating oil lubricates the portion between the piston and the cylinder chamber, and seals the cylinder chamber.

CITATION LIST

Patent Literature

PTL 1: Japanese Unexamined Patent Publication No. 2009-197684

SUMMARY OF INVENTION

Technical Problem

The hermetic compressor described in PTL 1 improves lubricity and compression efficiency, but a sliding loss has a room for improvement.

The present invention is devised to solve the above problem, and its object is to provide a hermetic compressor and a refrigerator that can improve lubricity and compression efficiency, and reduce a sliding loss.

Solution to Problem

A hermetic compressor from one aspect of the present invention includes: an electric element including a stator and a rotor that rotates relative to the stator; a compression element driven by the electric element; and a hermetic container that stores the electric element and the compression element, and accommodates lubricating oil, and the compression element includes: a shaft including a principal shaft to which the rotor is fixed and an eccentric shaft that is eccentric with respect to the principal shaft; a cylinder block including a bearing that rotatably supports the principal shaft and a cylinder having an inner space; a piston that reciprocates in the inner space; and a connection section that couples the piston to the eccentric shaft, and the piston includes: a columnar seal section in sliding contact with an inner peripheral face of the cylinder; two extension sections that have respective circular arc faces having the same radius as a radius of the seal section, are spaced in the circumferential direction, and extend from the seal section toward a bottom dead center side in the axial direction; and a columnar capture section that further extends toward the bottom dead center side than the extension sections, and has a radius that is smaller than the radius of the seal section.

Advantageous Effects of Invention

The present invention can achieve a hermetic compressor and a refrigerator that can improve lubricity and compression efficiency and reduce a sliding loss.

The above and other objects, features, and advantages of the present invention become apparent from following detailed description of preferred embodiments with reference to appended figures.

Figure 1:
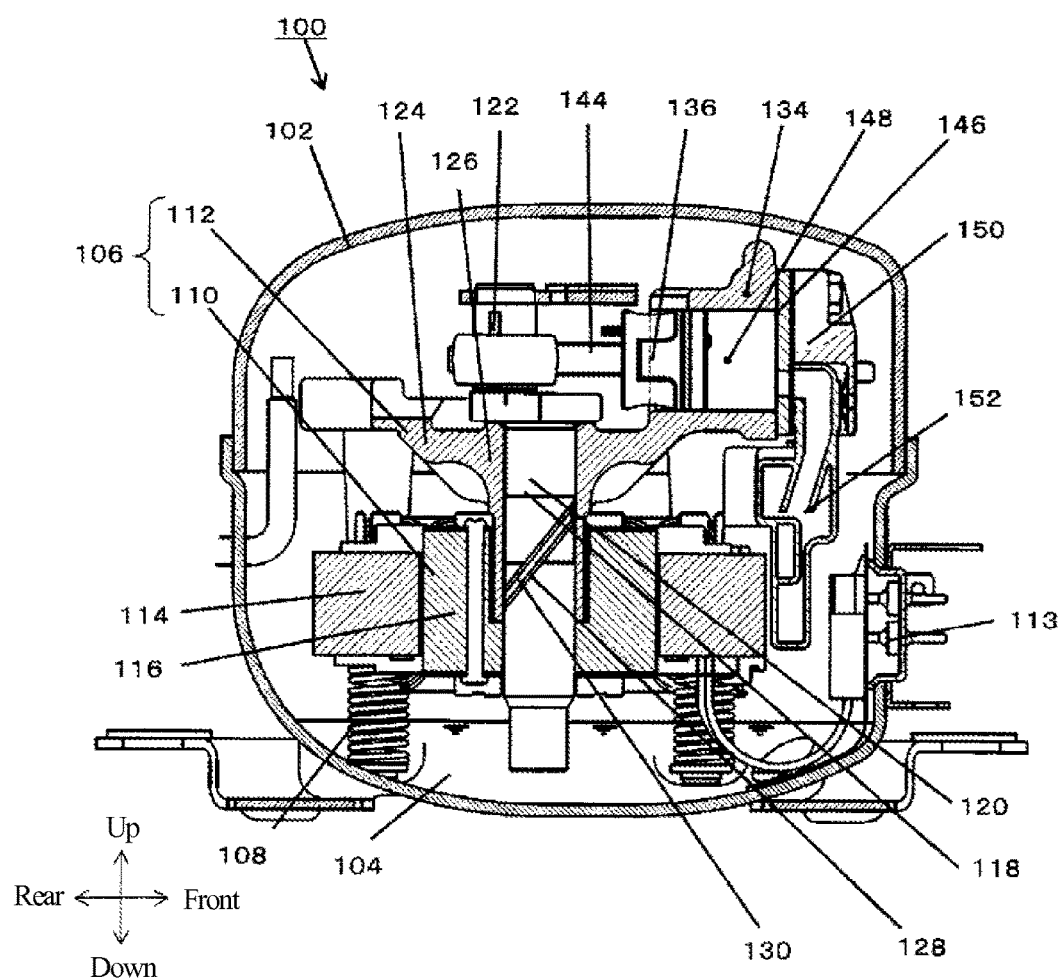
FIG. 1 is a sectional view illustrating a hermetic compressor in Embodiment 1 of the present invention.

DESCRIPTION OF EMBODIMENTS (Finding that Forms Basis for the Present Invention)

The Inventors examined the piston and the cylinder in order to improve lubricity and compression efficiency and reduce a sliding loss. As the sliding area of the piston is larger, the sliding loss generated when the piston reciprocates increases. In the hermetic compressor described in PTL 1, the entire outer peripheral face of the columnar piston acts as a sliding face, thereby increasing the sliding loss of the piston.

To decrease the area of the outer peripheral face of the piston, the axial length of the piston can be reduced. In this case, the inclination of the piston relative to the cylinder chamber becomes large, thereby increasing contact friction between the piston and the cylinder chamber to lower lubricity. Further, the length of the gap between the outer peripheral face of the piston and the inner peripheral face of the cylinder chamber decreases. Accordingly, the lubricating oil may lack, hermeticity of the cylinder chamber cannot be maintained, leading to lowering of compression efficiency.

Thus, the inventors found that using a below-mentioned piston having a seal section, an extension section, and a capture section could improve lubricity and compression efficiency and reduce the sliding loss. The present invention was devised based on the finding.

A hermetic compressor in accordance with a first aspect of the present invention includes: an electric element including a stator and a rotor that rotates relative to the stator; a compression element driven by the electric element; and a hermetic container that stores the electric element and the compression element, and accommodates lubricating oil, and the compression element includes: a shaft including a principal shaft to which the rotor is fixed and an eccentric shaft that is eccentric with respect to the principal shaft; a cylinder block including a bearing that rotatably supports the principal shaft and a cylinder having an inner space; a piston that reciprocates in the inner space; and a connection section that couples the piston to the eccentric shaft, and the piston includes: a columnar seal section in sliding contact with an inner peripheral face of the cylinder; two extension sections that have respective circular arc faces having the same radius as a radius of the seal section, are spaced in the circumferential direction, and extend from the seal section toward a bottom dead center side in the axial direction; and a columnar capture section that further extends toward the bottom dead center side than the extension sections, and has a radius that is smaller than the radius of the seal section.

In accordance with a second aspect of the present invention, in the hermetic compressor according to the first aspect of the present invention, when the piston is located at the bottom dead center, at least a part of the capture section may be exposed outside of the cylinder.

In accordance with a third aspect of the present invention, in the hermetic compressor according to the first or second aspect of the present invention, the capture section may be formed over the entire circumference of the piston closer to the bottom dead center side than the extension section.

In accordance with a fourth aspect of the present invention, in the hermetic compressor according to any one of the first to third aspects of the present invention, the axial length of the extension section may be one third or more of, and three times or less of the circumferential width of the extension section.

In accordance with a fifth aspect of the present invention, in the hermetic compressor according to the fourth aspect of the present invention, a length of the extension section may be equal to a width of the extension section.

In accordance with a sixth aspect of the present invention, the hermetic compressor according to any one of the first to fifth aspects of the present invention may further include a pin that connects the connection section to the piston, and a length of the extension section may be one half or more of, and three over two or less of a diameter of the pin.

In accordance with a seventh aspect of the present invention, in the hermetic compressor according to any one of the first to sixth aspects of the present invention, a length of the extension section may be larger than a length of the seal section, and a central angle of a circular arc of the extension section may be 40 degrees or more and 90 degrees or less.

In accordance with an eighth aspect of the present invention, in the hermetic compressor according to any one of the first to seventh aspects of the present invention, given that a direction in which the piston is pushed toward the inner peripheral face of the cylinder by the connection section when the piston moves toward the top dead center is a load side, and a direction opposite to the load side is a non-load side, a width of one extension section of the two the extension sections, which is located on the load side, may be 1.2 times as much as a width of the other extension section located on the non-load side.

In accordance with a ninth aspect of the present invention, in the hermetic compressor according to any one of the first to eighth aspects of the present invention, the piston may further include a lubricating oil lead-in section formed as an inclined face between the extension section and the capture section.

In accordance with a tenth aspect of the present invention, in the hermetic compressor according to any one of the first to ninth aspects of the present invention, a corner that connects a circumferential edge of the extension section to an edge on the bottom dead center side of the seal section may be a rounded section curved like a circular arc.

In accordance with an eleventh aspect of the present invention, in the hermetic compressor according to the tenth aspect of the present invention, a radius of the rounded section may be 25% or more of, and 50% or less of a width of the extension section.

In accordance with a twelfth aspect of the present invention, in the hermetic compressor according to any one of the first to eleventh aspects of the present invention, the seal section may be provided with an annular groove.

In accordance with a thirteenth aspect of the present invention, in the hermetic compressor according to any one of the first to twelfth aspects of the present invention, the piston may be subjected to a surface treatment with a synthetic resin.

In accordance with a fourteenth aspect of the present invention, in the hermetic compressor according to any one of the first to thirteenth aspects of the present invention, an axial length of a portion of the inner peripheral face of the cylinder, which is opposed to the extension section, may be larger than a remaining portion of the inner peripheral face.

In accordance with a fifteenth aspect of the present invention, in the hermetic compressor according to any one of the first to fourteenth aspects of the present invention, at least a part of the inner peripheral face of the cylinder may be tapered such that a radius on the bottom dead center side is larger than a radius on the top dead center side.

In accordance with a sixteenth aspect of the present invention, in the hermetic compressor according to any one of the first to fifteenth aspects of the present invention, the electric element may be driven by an inverter circuit with a plurality of rotation speeds.

A refrigerator in accordance with a seventeenth aspect of the present invention includes the hermetic compressor according to any one of the first to sixteenth aspects of the present invention.

Embodiments of the present invention will be specifically described below with reference to figures. The same or equivalent constituents through all figures are given the same reference numerals, and overlapping description thereof is omitted. A direction parallel to the principal shaft of the shaft is referred to as a vertical direction, a direction parallel to the central axis of the inner space of the cylinder is referred to as a forward and rearward direction, and a direction vertical to the vertical direction and the forward and rearward direction is referred to as a transverse direction. In the forward and rearward direction, the top dead center side of the piston is referred to as a front side, and the bottom dead center side of the piston is referred to as a rear side.

(Embodiment 1)

<Configuration of Hermetic Compressor>

Figure 2:
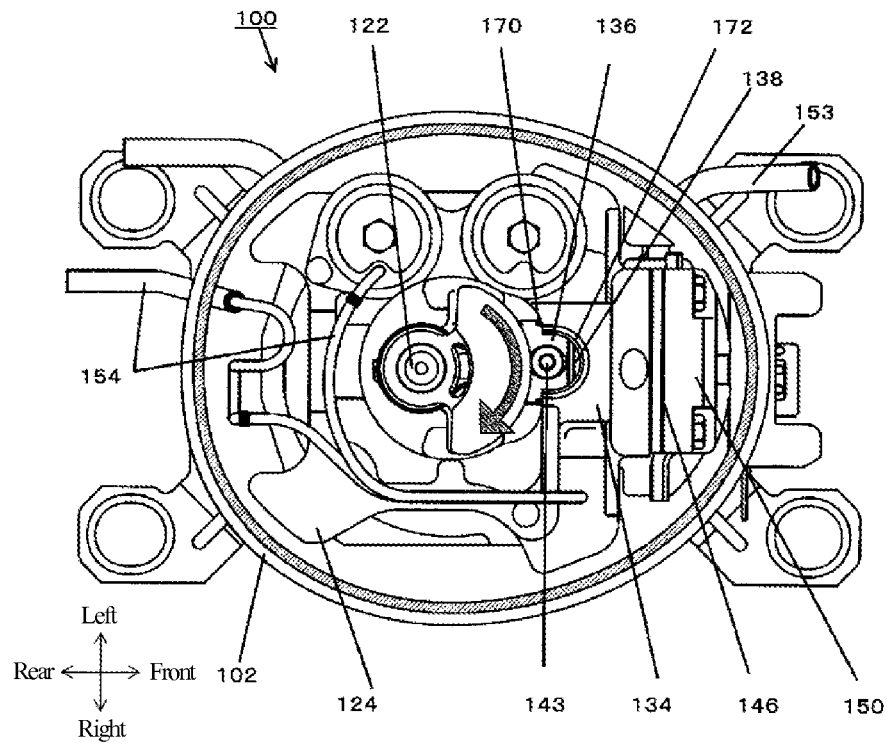
FIG. 2 is a sectional view illustrating the hermetic compressor taken along a direction vertical to a principal shaft in FIG. 1.

FIG. 1 is a sectional view illustrating a hermetic compressor 100 in Embodiment 1. FIG. 2 is a sectional view illustrating the hermetic compressor 100 taken along a direction vertical to a principal shaft 120 in FIG. 1. As illustrated in FIG. 1 and FIG. 2, the hermetic compressor 100 includes a compressor body 106 and a hermetic container 102 that stores the compressor body 106, and puts refrigerant gas into a high-temperature and high-pressure state by using the compressor body 106 to eject the refrigerant gas from the hermetic container 102.

Lubricating oil 104 and the refrigerant gas are charged in the hermetic container 102. The lubricating oil 104 is used to make the operation of a compression element 112 smooth, and is accumulated on the bottom of the hermetic container 102. For example, hydrocarbon-based R600a (isobutene) having a low global warming potential is used as the refrigerant gas. The hermetic container 102 is provided with a power terminal 113 connected to an electric element 110 of the compressor body 106. An inverter power source (not shown) is connected to the power terminal 113.

The compressor body 106 includes the electric element 110 and the compression element 112 driven by the electric element 110. The compressor body 106 is elastically supported, for example, by a suspension spring 108.

The electric element 110 has a stator 114 and a rotor 116, and is, for example, a salient-pole concentration winding DC brushless motor. The rotor 116 is columnar, and has a columnar space therein. The rotor 116 is disposed on the inner side of the stator 114, and has a permanent magnet (not shown) therein. The stator 114 is formed of a plurality of elements that are arranged into a substantially tube shape. Each of the elements has an iron core formed of laminated thin steel plates, and a copper winding is wound around a plurality of magnetic pole teeth provided at the iron core via an insulating member. The winding is continuous over all the elements, and its end is connected to an inverter circuit (not shown) outside of the hermetic compressor 100 via the power terminal 113 by use of a conductive wire. The rotor 116 is driven with respect to the stator 114 by the inverter circuit with a plurality of rotation speeds.

The compression element 112 is disposed above the electric element 110. The compression element 112 includes a shaft 118, a cylinder block 124, a piston 136, a connection section 144, and an oil supply mechanism 130. The shaft 118 includes the principal shaft 120 and an eccentric shaft 122.

A lower portion of the principal shaft 120 is fixedly inserted into the columnar space in the rotor 116 of the electric element 110. A lower end of the principal shaft 120 protrudes downward from the rotor 116, and is immersed in the lubricating oil 104 accumulated on the bottom of the hermetic container 102. The eccentric shaft 122 extends from an upper end of the principal shaft 120, and parallel to the principal shaft 120 while being not coincide with the principal shaft 120.

The oil supply mechanism 130 is provided in the principal shaft 120, and supplies the lubricating oil 104 to a sliding portion of the compression element 112. For example, the oil supply mechanism 130 includes a centrifugal pump (not shown) and a spiral groove 128. The centrifugal pump is formed of an inclined hole in the principal shaft 120, and pumps the lubricating oil 104 up through an opening at a lower end of the inclined hole with rotation of the principal shaft 120. The spiral groove 128 extends upward on the outer peripheral face of the principal shaft 120 between the outer peripheral face of the principal shaft 120 and an inner peripheral face of a principal bearing 126. The lower end of the spiral groove 128 communicates with the opening at an upper end of the inclined hole of the centrifugal pump, and the upper end is connected to the vicinity of the sliding portion of the eccentric shaft 122.

The cylinder block 124 has the principal bearing 126 extending in the vertical direction, and a cylinder 134 extending in the forward and rearward direction. The principal bearing 126 includes a columnar through hole extending in the vertical direction. The principal shaft 120 is rotatably inserted into the through hole. The inner peripheral face of the principal bearing 126 radially supports the principal shaft 120. The principal bearing 126 along with the principal shaft 120 supports a load exerted onto the eccentric shaft 122.

The cylinder 134 has a tube-like inner space (columnar inner space). The columnar inner space extends in the forward and rearward direction, and is surrounded with the inner peripheral face of the cylinder 134. A valve plate 146 is attached to a front end face of the cylinder 134. The front side of the columnar inner space is blocked with the valve plate 146. A cylinder head 150 is fixed to the front end face of the cylinder 134 so as to cover the valve plate 146. A suction muffler 152 is attached between the valve plate 146 and the cylinder head 150. The suction muffler 152 is made of resin such as PBT (polybutylene terephthalate) to reduce a sound of the refrigerant gas flowing from a suction tube 153 by an internal damping space.

As illustrated in FIG. 2, a slot section 172 is provided in an upper portion of the cylinder 134. The slot section 172 is a cutaway section cut at the upper portion of the cylinder 134 from a rear end 170 toward the central axis of the cylinder 134 (axial direction).

A front portion of the piston 136 is reciprocatably inserted into the columnar inner space in the cylinder 134. Thereby, a compression chamber 148 surrounded with the inner peripheral face of the cylinder 134, the piston 136, and the valve plate 146 is formed in the columnar inner space.

A rear portion of the piston 136 is connected to the connection section 144. The connection section 144 has a hole at each end. A piston pin 143 attached to the piston 136 is fitted into the hole at one end. The eccentric shaft 122 is fitted into the hole at the other end. In this manner, the connection section 144 connects the eccentric shaft 122 to the piston 136.

<Structure of Piston>

Figure 3A:
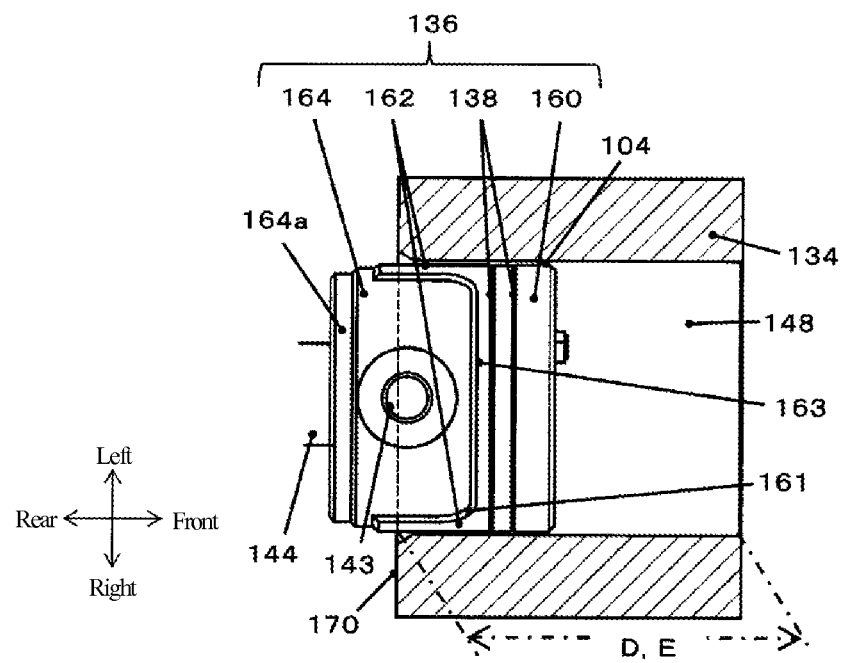
FIG. 3A is a view illustrating a piston inserted into a cylinder in FIG. 1 when viewed from above.
Figure 3B:
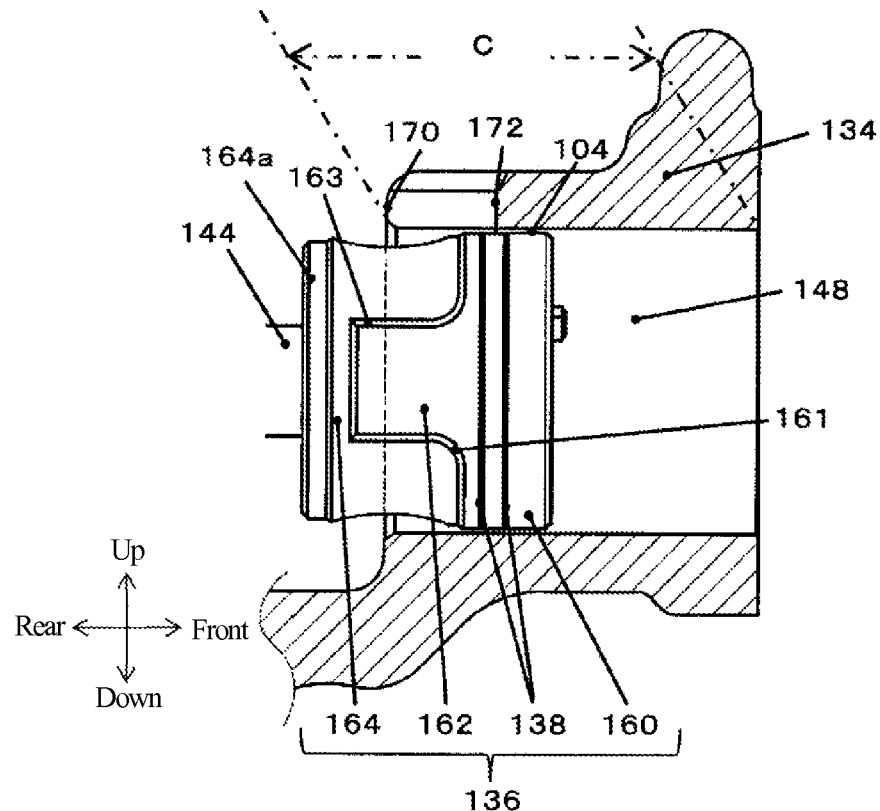
FIG. 3B is a view illustrating the piston inserted into the cylinder in FIG. 1 when viewed from right.
Figure 4:
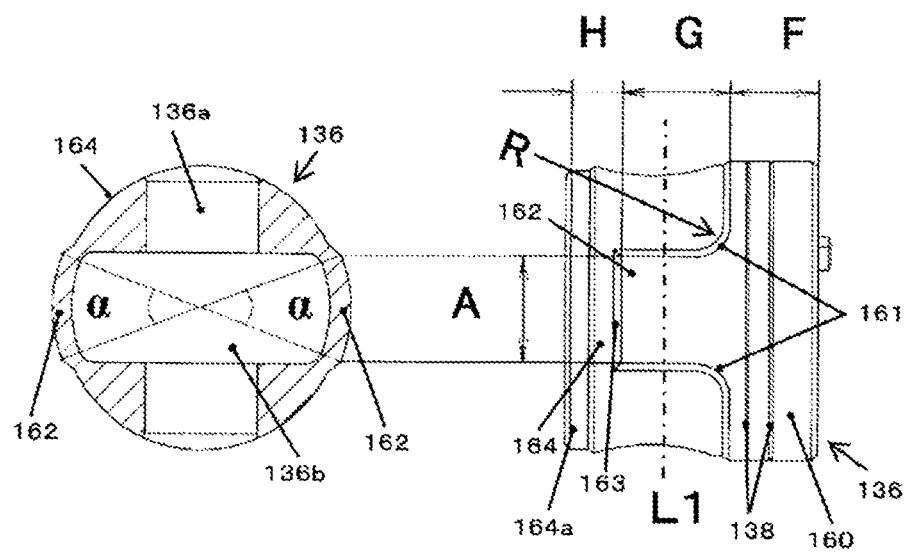
FIG. 4 is a view illustrating the piston in FIG. 1.

FIG. 3A is a view illustrating the piston 136 inserted into the cylinder 134 when viewed from above. FIG. 3B is a view illustrating the piston 136 inserted into the cylinder 134 when viewed from right. In FIG. 3A and FIG. 3B, to clarify the positional relation between the cylinder 134 and the piston 136, the cylinder 134 is cut along its central axis. FIG. 4 illustrates the piston 136. The right side in FIG. 4 illustrates the piston 136 when viewed from right. The left side in FIG. 4 is a sectional view illustrating the piston 136 cut along a line L1 in the right side in FIG. 4.

As illustrated in FIG. 3A to FIG. 4, the piston 136 is substantially columnar, and for example, has a diameter of 20 to 26 mm and a length of 65 to 105% of the diameter. The piston 136 has a front face on the front side (top dead center side), a rear face on the rear side (bottom dead center side), and an outer peripheral face between the front face and the rear face. The piston 136 is provided with a seal section 160, extension sections 162, and a capture section 164. The piston 136 further includes a vertical hole 136a and a horizontal hole 136b.

The seal section 160 is columnar, and is provided on the front side of the piston 136. For example, a length F of the seal section 160 along the central axis of the piston 136 (axial direction) is 20 to 40% of the diameter of the piston 136. The radius of the seal section 160 is set to be slightly smaller than the radius of the inner peripheral face of the cylinder 134. Accordingly, a gap is formed between the outer peripheral face of the seal section 160 and the inner peripheral face of the cylinder 134. The lubricating oil 104 fills the gap to seal a compression chamber 148. The seal section 160 slidably contacts (is in sliding contact with) the inner peripheral face of the cylinder 134 via the lubricating oil 104. Thus, the seal section 160 is a sliding portion sliding in contact with the inner peripheral face of the cylinder 134 via the lubricating oil 104.

Annular grooves 138 are provided in the seal section 160. In this embodiment, the two annular grooves 138 are spaced in parallel to each other. The annular grooves 138 extend over the entire circumference of the seal section 160 in the direction vertical to the axis of the piston 136. The width and depth dimensions of the annular grooves 138 are 0.5 mm, for example. As illustrated in FIG. 2 and FIG. 3B, when the piston 136 is located at the bottom dead center, the annular grooves 138 is partially exposed outside of the cylinder 134 from the slot section 172. The number of the annular grooves 138 may be one or zero.

As illustrated in FIG. 3A to FIG. 4, the extension sections 162 are provided closer to the rear side than the seal section 160, and extend along the axis of the piston 136. A front end of the extension section 162 is connected to a rear end of the seal section 160, and the extension section 162 communicates with the seal section 160. A rear end of the extension section 162 is formed vertical to the central axis of the piston 136. Both circumferential edges of the extension section 162 are parallel to each other. Accordingly, the extension section 162 is rectangular or square when viewed in the transverse direction.

The extension sections 162 each have a circular arc face having the same radius as that of the seal section 160. That is, circumferential faces of the extension sections 162 and the seal section 160 are flush with each other. Accordingly, the extension sections 162 along with the seal section 160, and the inner peripheral face of the cylinder 134 form a gap filled with the lubricating oil 104 therebetween. Thus, the extension sections 162 are sliding portions sliding in contact with the inner peripheral face of the cylinder 134 via the lubricating oil 104.

The two extension sections 162 are spaced in the circumferential direction of the piston 136. The two extension sections 162 are symmetric about the central axis of the piston 136, and are disposed on the left side and the right side in the columnar inner space. A central angle of a circular arc of the extension section 162, that is, an angle α that the piston 136 forms with the central axis is, for example, 40 degrees or more and 90 degrees or less, and preferably, 40 degrees or more and 60 degrees or less. In this embodiment, the angle α is set to 42 degrees.

A length G of the extension section 162 in the axial direction of the piston 136 may be set as appropriate. Specific examples will be described below. The length G of the extension section 162 is one third or more of, and three times or less of a width A of the extension section 162 in the circumferential direction of the piston 136. Preferably, the length G of the extension section 162 is one half or more of, and twice or less of the width A of the extension section 162. Preferably, the length G of the extension section 162 is 0.7 or more of, and 1.3 or less of the width A of the extension section 162, in which the extension section 162 becomes substantially square, and more preferably, the length G of the extension section 162 is equal to the width A of the extension section 162, in which the extension section 162 becomes square. The length G of the extension section 162 is one half or more of, and three over two or less of a diameter of the piston pin 143. The length G of the extension section 162 is larger than the length F of the seal section 160. The length G of the extension section 162 is, for example, 30 to 50% of the diameter of the piston 136.

Corners that are connections between the circumferential edge of the extension section 162 and an end (rear end) of the seal section 160 on the bottom dead center side are formed of curved rounded sections 161. A radius R of each rounded section 161 is 25% or more of, and 50% or less of the width A of the extension section 162. Preferably, the radius R is 30% or more of, and 35% or less of the width A.

The capture section 164 is provided closer to the rear side than the seal section 160, and extends further to the rear side than the extension section 162 in the axial direction of the piston 136. The capture section 164 is dented (reduced in diameter) from the seal section 160 and the extension section 162. That is, the capture section 164 has a substantially columnar portion located closer to the rear side than the extension section 162 and a substantially semi columnar portion between the two extension sections 162. The former portion of the capture section 164 is formed over the entire circumference of the piston 136. The radius of each of the portions is smaller than the seal section 160. Accordingly, the gap between the capture section 164 and the inner peripheral face of the cylinder 134 is larger than the gap between the seal section 160 and the extension section 162, and the inner peripheral face of the cylinder 134. Thus, capture section 164 is not a sliding portion, but a non-sliding portion.

The columnar stepped section 164a is formed at the rear end of the capture section 164. The radius of the stepped section 164a is smaller than that of the remaining portion of the capture section 164 to generate a step between the stepped section 164a and the remaining portion. Accordingly, the gap between the stepped section 164a and the inner peripheral face of the cylinder 134 is larger than the gap between the remaining portion and the inner peripheral face of the cylinder 134.

Figure 5:
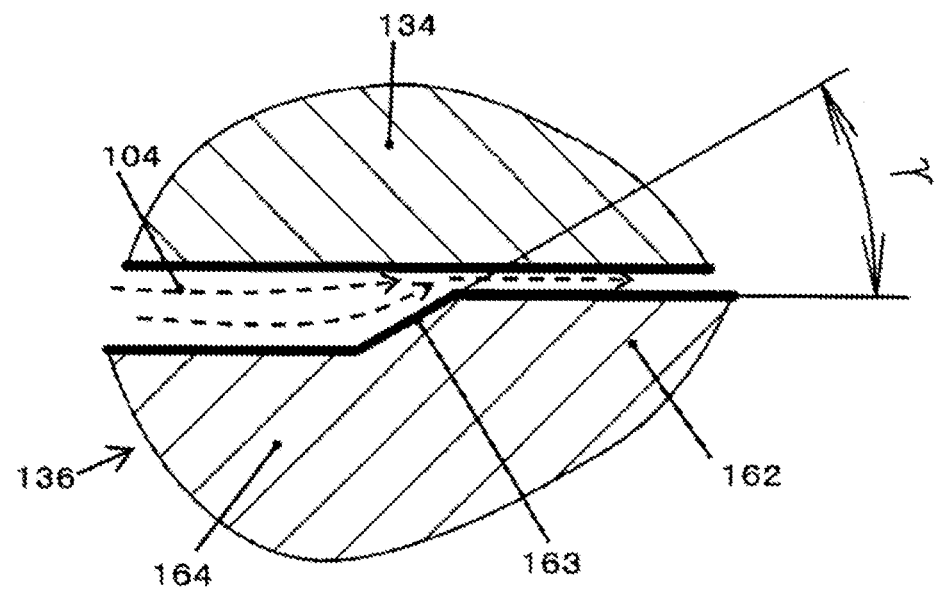
FIG. 5 is a partially enlarged sectional view illustrating the piston and the cylinder in FIG. 1.

FIG. 5 is a partially enlarged sectional view of the piston 136 and the cylinder 134. As illustrated in FIG. 5, a lubricating oil lead-in section 163 is provided between the extension section 162 and the capture section 164. The lubricating oil lead-in section 163 is an inclined face, and the inclination is moderate and its inclination angle γ is 45 degrees or less, for example. As illustrated in the right side in FIG. 4, an inclined section is provided between the seal section 160 and the capture section 164. The inclined section is a gently inclined face, and its inclination angle is 45 degrees or less, for example.

As illustrated in FIG. 4, the vertical hole 136a is provided in the capture section 164 on the rear side of the seal section 160, and is disposed between the two extension sections 162. The vertical hole 136a extends vertical to the axis of the piston 136, and penetrates the piston 136 in the vertical direction. The horizontal hole 136b is a vertically flat space, extends in the axial direction of the piston 136, and is opened on the rear face of the piston 136.

As illustrated in FIG. 3A and FIG. 4, the piston pin 143 is columnar, and is inserted into the vertical hole 136a. Thus, the extension sections 162 extend further to the rear side than the center of the piston pin 143. The piston 136 is made of, for example, an iron-based sintered material, and is coated with a manganese phosphate film The diameter of the piston pin 143 is 25% or more of, and 45% or less of the diameter of the piston 136.

When the connection section 144 is coupled to the piston 136, one end of the connection section 144 is inserted into the horizontal hole 136b. Thereby, a hole at the one end matches the vertical hole 136a. For this reason, when the piston pin 143 is inserted into the vertical hole 136a, the piston pin 143 passes the hole of the connection section 144. Thus, the connection section 144 is connected to the piston 136.

<Operations of Hermetic Compressor>

As illustrated in FIG. 1, a power source (not shown) such as a commercial power source provided outside of the hermetic container 102 is connected to the power terminal 113 of the hermetic container 102. Thus, the external power source supplies AC power to the electric element 110, and the rotor 116 is rotated with a magnetic field generated in the stator 114 by the electric element 110. In this connection, the principal shaft 120 fixed to the rotor 116 rotates, and the eccentric shaft 122 coupled to the principal shaft 120 eccentrically rotates in the direction represented by an arrow in FIG. 2.

The rotation of the eccentric shaft 122 is converted into reciprocation by the connection section 144, such that the piston 136 reciprocates in the columnar inner space of the cylinder 134. With the motion of the piston 136, the capacity of the compression chamber 148 closed with the piston 136 varies. When the piston 136 moves to increase the capacity, the refrigerant gas flows from the suction tube 153 in the hermetic container 102, and then suctioned in the compression chamber 148 via the suction muffler 152. On the contrary, when the piston 136 moves to decrease the capacity, the refrigerant gas is compressed in the compression chamber 148 and then, the high-temperature and high-pressure refrigerant gas is sent to a refrigeration cycle (not shown) through an ejection tube 154.

With the rotation of the principal shaft 120, the lubricating oil 104 is pumped up by a pump section in the lower portion of the principal shaft 120, is moved through the oil supply mechanism 130 with a centrifugal force and a viscous force, and is supplied to each sliding portion of the compression element 112. At this time, a part of the lubricating oil 104 is distributed from the top of the eccentric shaft 122. Accordingly, friction and wear of each sliding portion are reduced.

<Actions and Effects>

The connection section 144 converts the rotation of the eccentric shaft 122 to reciprocate the piston 136. At this time, the connection section 144 moves the piston 136 against the pressure of the compression chamber 148 and the inertial force of the piston 136. As a result, a load inclined with respect to the axis of the cylinder 134 acts on the piston 136. The piston 136 is pressed onto the inner peripheral face of the cylinder 134 with a component force of the load in the transverse direction. To counteract the force, the seal section 160 and the extension sections 162 are provided on the right side and the left side of the piston 136. Thereby, the seal section 160 and the extension sections 162 bear the load on the piston 136 in the transverse direction. Accordingly, the sliding area of the piston 136 on the sections other than the seal section 160 and the extension sections 162, that is, the sections that do not contribute to perform sealing and support the load can be reduced. Thus, the sliding loss of the piston 136 can be reduced.

When the piston 136 is located at the bottom dead center, the annular grooves 138 is partially exposed outside of the cylinder 134 from the slot section 172. At this time, the lubricating oil 104 distributed from the upper portion of the eccentric shaft 122 (FIG. 1) is supplied to the annular grooves 138 via the slot section 172. The lubricating oil 104 adhered to the upper portion of the cylinder 134 is also supplied to the annular grooves 138 via the slot section 172. With the reciprocation of the piston 136, the lubricating oil 104 in the annular grooves 138 is supplied to the entire seal section 160. In this manner, the lubricating oil 104 fills between the inner peripheral face of the cylinder 134 and the seal section 160. Thus, the compression chamber 148 is sealed, so that the refrigerant gas is prevented from leaking from the compression chamber 148, thereby improving compression efficiency of the hermetic compressor 100. Accordingly, lubricity of the seal section 160 can be improved.

As illustrated in FIG. 3A, when the piston 136 is located at the bottom dead center, at least a part of the capture section 164 is exposed outside of the cylinder 134. Thus, the lubricating oil 104 distributed from the upper portion of the eccentric shaft 122 (FIG. 1) adheres to the capture section 164. When the piston 136 is inserted into the columnar inner space of the cylinder 134, the lubricating oil 104 is supplied from the capture section 164 to the extension section 162 and the seal section 160. Thus, lubricity and compression efficiency are further improved.

The capture section 164 is formed over the entire circumference of the piston 136. Thus, the capture section 164 can receive the distributed lubricating oil 104 with a large area, and from a wide range of direction. Accordingly, the capture section 164 can receive the lubricating oil 104 more efficiently.

The gap between the stepped section 164a of the capture section 164 and the inner peripheral face of the cylinder 134 is larger than the gap between the remaining portion of the capture section 164 and the inner peripheral face of the cylinder 134. Thus, the entrance of the gap is large, thereby smoothly supplying the lubricating oil 104 adhered to the capture section 164 to the gap.

With the reciprocation of the piston 136, as illustrated in FIG. 5, the lubricating oil 104 in the capture section 164 is moved to the region having a small gap with the inner peripheral face of the cylinder 134 by the lubricating oil lead-in section 163. That is, the lubricating oil 104 moves to the extension section 162 via the lubricating oil lead-in section 163. At this time, since the inclination of the lubricating oil lead-in section 163 is small, the lubricating oil 104 can rapidly flow on the lubricating oil lead-in section 163. As a result, the lubricating oil 104 is smoothly supplied to the extension section 162.

As illustrated in the right side in FIG. 4, corners between the extension section 162 and the seal section 160 are formed of the curved rounded sections 161. Thus, the shape of the piston 136 becomes stable by polishing. Moreover, at assembling of the hermetic compressor 100, the piston 136 can be smoothly inserted into the columnar inner space of the cylinder 134. Consequently, the productivity of the hermetic compressor 100 increases.

The radius R of the rounded section 161 is set to be 25 to 50% of the width A of the extension section 162. Thus, the lubricating oil 104 travelling between the two extension sections 162 is supplied to the seal section 160 as well as the extension sections 162.

Figure 6A:
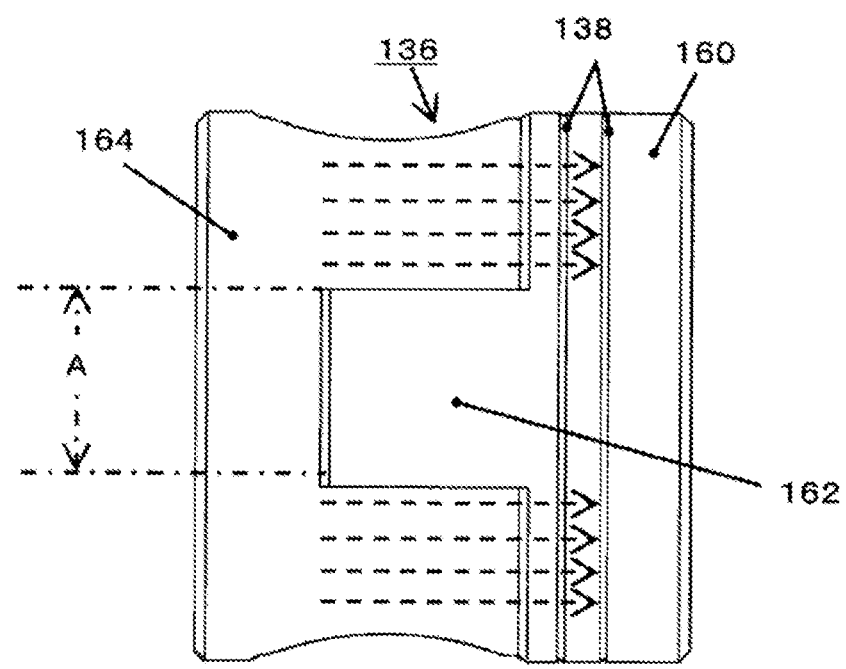
FIG. 6A is a view illustrating a piston without a rounded section.

That is, the radius R of the rounded section 161 in FIG. 6A is less than 25% of the width A. In this case, the lubricating oil 104 travels parallel to the extension sections 162 as represented by broken arrows. Thus, the lubricating oil 104 between the two extension sections 162 is mostly supplied to the seal section 160. When the radius R of the rounded section 161 becomes larger than 50% of the width A, the distance between the capture section 164 and the center of the extension section 162 becomes large. Thus, the lubricating oil 104 is not sufficiently supplied from the capture section 164 to the center of the extension section 162 on which a large load acts, thereby possibly degrading lubricity.

Figure 6B:
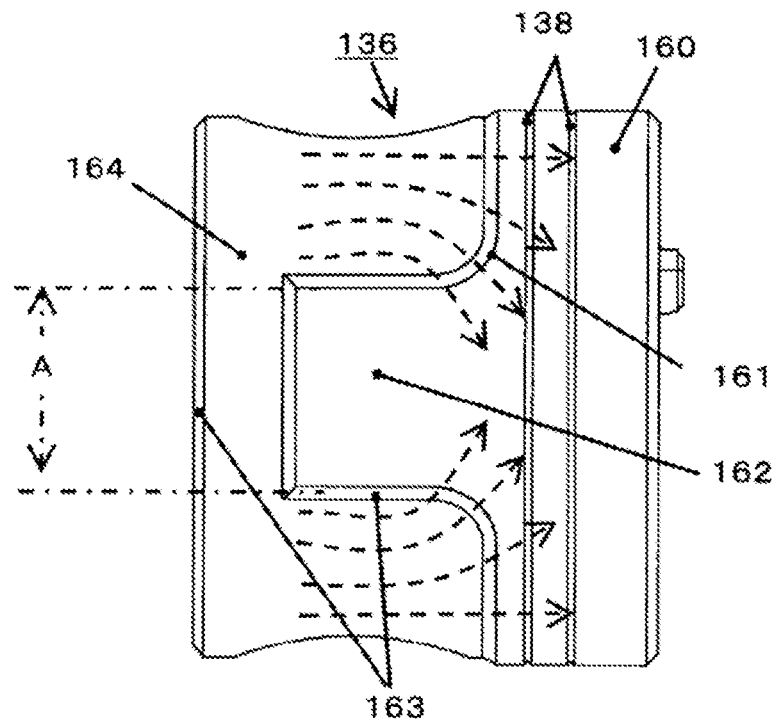
FIG. 6B is a view illustrating the piston with a rounded section in FIG. 1.

The radius R of the rounded section 161 illustrated in FIG. 6B is 25% or more of, and 50% or less of the width A. In this case, the path of the lubricating oil 104 is bent by the rounded sections 161 as represented by broken arrows. As a result, the lubricating oil 104 between the two extension sections 162 moves to the seal section 160 and the extension sections 162. Thus, the lubricating oil 104 is sufficiently supplied between the seal section 160 and the extension section 162, and the inner peripheral face of the cylinder 134 (FIG. 3A). Accordingly, lubricity of the regions can be maintained, and friction and wear can be suppressed.

As illustrated in FIG. 4, the length G of the extension section 162 is set to be longer than the length F of the seal section 160, and the central angle α of the circular arc of the extension section 162 is set to be 40 degrees or more. Thus, when the piston 136 reciprocates in the columnar inner space of the cylinder 134, the contact angle that the piston 136 forms with the inner peripheral face of the cylinder 134 can be reduced. Accordingly, friction between the piston 136 and the inner peripheral face of the cylinder 134 can be suppressed, thereby reducing the sliding loss of the piston 136.

Figure 7A:
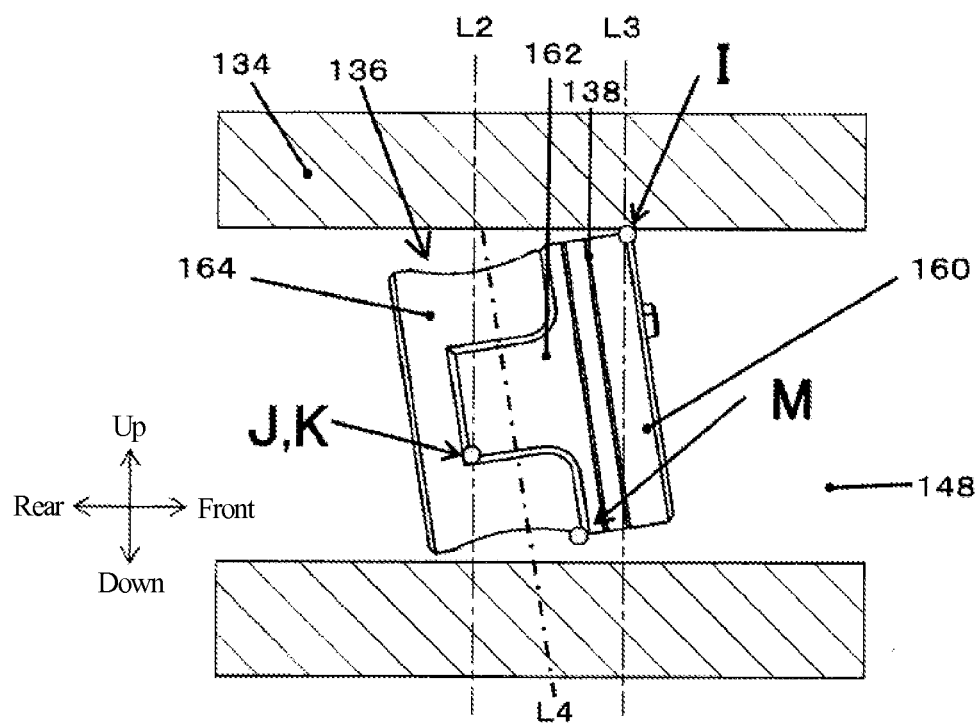
FIG. 7A is a view illustrating the piston inserted into the cylinder in FIG. 1 when viewed from right.
Figure 7B:
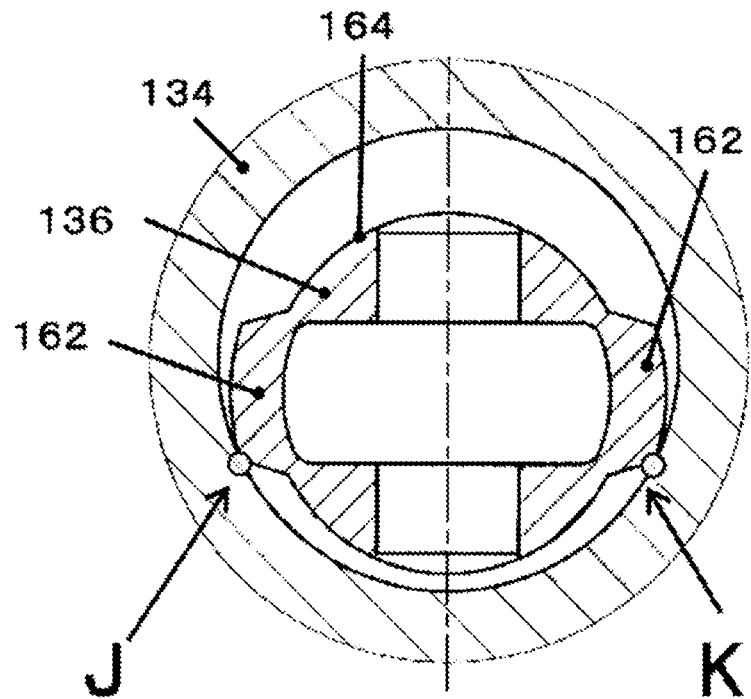
FIG. 7B is a sectional view illustrating the cylinder and the piston taken along a line L2 in FIG. 7A.
Figure 7C:
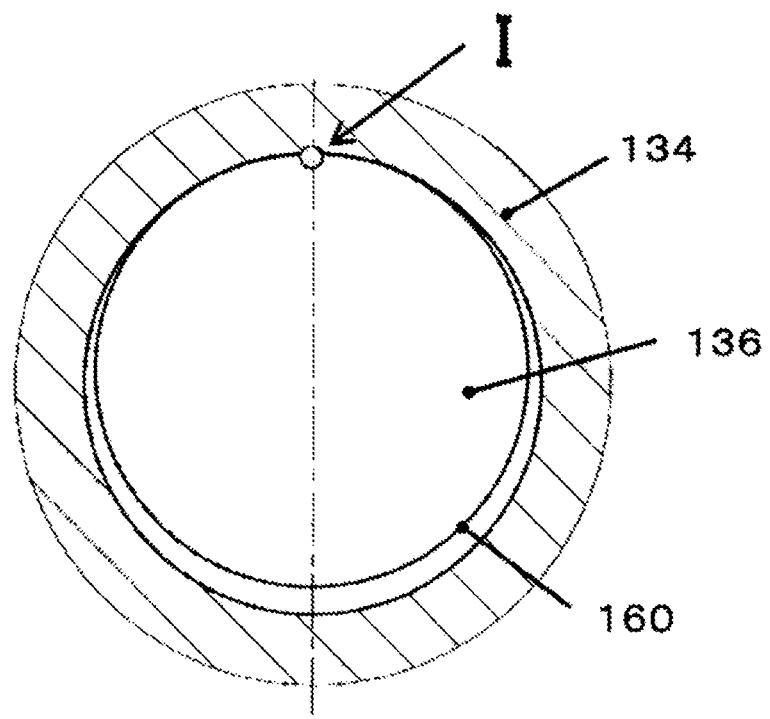
FIG. 7C is a sectional view illustrating the cylinder and the piston taken along a line L3 in FIG. 7A.

Specifically, FIG. 7A is a view illustrating the piston 136 inserted into the columnar inner space of the cylinder 134 when viewed from right. In FIG. 7A, to clarify the positional relation between the cylinder 134 and the piston 136, the cylinder 134 is cut along its axis. FIG. 7B is a sectional view illustrating the cylinder 134 and the piston 136 taken along a line L2 in FIG. 7A. FIG. 7C is a sectional view illustrating the cylinder 134 and the piston 136 taken along a line L3 in FIG. 7A. For convenience of description, in FIG. 7A to FIG. 7C, the gap between the piston 136 and the inner peripheral face of the cylinder 134 is drawn larger than actual.

As illustrated in FIG. 7A, because the piston 136 and the inner peripheral face of the cylinder 134 have the gap therebetween, the piston 136 can be slightly inclined in the columnar inner space of the cylinder 134. As illustrated in FIG. 7B, a portion of the piston 136 in the rear of the seal section 160 has a length in the vertical direction (diameter of the capture section 164) that is smaller than a length in the transverse direction (diameter of the extension section 162). Thus, the piston 136 is inclined in the vertical direction more easily than in the transverse direction.

When the piston 136 is inclined with a largest angle in the vertical direction, an upper portion I at the front end of the seal section 160 in FIG. 7C contacts the inner peripheral face of the cylinder 134, and lower portions J and K at the rear end of the extension section 162 in FIG. 7B contacts the inner peripheral face of the cylinder 134.

Figure 8:
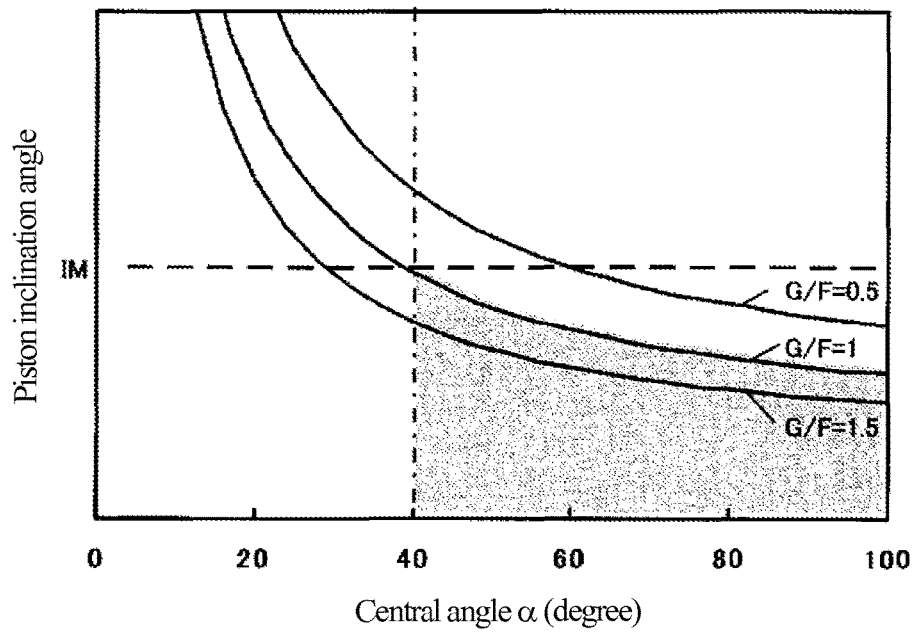
FIG. 8 is a graph illustrating the inclination angle of the piston in FIG. 7A and a central angle $\alpha$ of an extension section.

FIG. 8 is a graph illustrating the relation between the central angle α of the extension section 162 and the inclination angle of the piston 136. The horizontal axis indicates the central angle α (degree) the circular arc of the extension section 162. The vertical axis indicates the inclination of the piston 136 formed when the upper portion I at the front end of the seal section 160 and the lower portions J, K at the rear end of the extension section 162 contact the inner peripheral face of the cylinder 134. An inclination angle IM is the inclination of the piston 136 formed when the upper portion I at the front end of the seal section 160 and a lower portion M at the rear end of the seal section 160 contact the inner peripheral face of the cylinder 134.

As illustrated in FIG. 8, when the ratio of the length G of the extension section 162 to the length F of the seal section 160 (G/F) is 1 or more and the central angle α is 40 degrees or more, the inclination of the piston 136 is smaller than the inclination angle IM. That is, as compared to the case where the lower portion M contacts the inner peripheral face of the cylinder 134, the contact angle that the piston 136 forms with the inner peripheral face of the cylinder 134 becomes smaller. Accordingly, friction and wear between the piston 136 and the inner peripheral face of the cylinder 134 can be suppressed. Thus, the sliding loss during the reciprocation of the piston 136 can be reduced.

The length G of the extension section 162 is set to be one half or more of, and three over two or less of the diameter of the piston pin 143. Accordingly, lubricity can be maintained while the sliding loss of the piston 136 is suppressed.

That is, as illustrated in FIG. 3A, the piston 136 is connected to the connection section 144 via the piston pin 143. Thus, a load applied from the connection section 144 to the piston 136 in the transverse direction acts on the piston pin 143. As the piston pin 143 is separated from the seal section 160, the piston 136 becomes longer and heavier and thus, the piston pin 143 is generally located immediately behind the seal section 160. Thus, when the length G of the extension section 162 is one half or more of the diameter of the piston pin 143, the extension sections 162 are provided at a part of the piston 136, which sandwiches the center of the piston pin 143 in the transverse direction. Thereby, the extension sections 162 can support the piston pin 143, which is an action point of the load, in the transverse direction. For this reason, even when the sliding area of the piston 136 is decreased, the piston 136 is hardly inclined in the transverse direction, such that the piston 136 can stably reciprocate. Accordingly, the sliding loss of the piston 136 can be reduced.

Because the length G of the extension section 162 is three over two or less of the diameter of the piston pin 143, the extension section 162 can receive the load of the piston 136 in the transverse direction more reliably.

The length G of the extension section 162 is one third or more of, and three times or less of the width A of the extension section 162, preferably, one half or more, and twice or less, more preferably, 0.7 or more, and 1.3 or less, and still more preferably, is equal to the width A of the extension section 162.

By setting the length G of the extension section 162 with respect to the width A of the extension section 162 in this manner, a sliding loss of the piston 136 can be suppressed.

Figure 9:
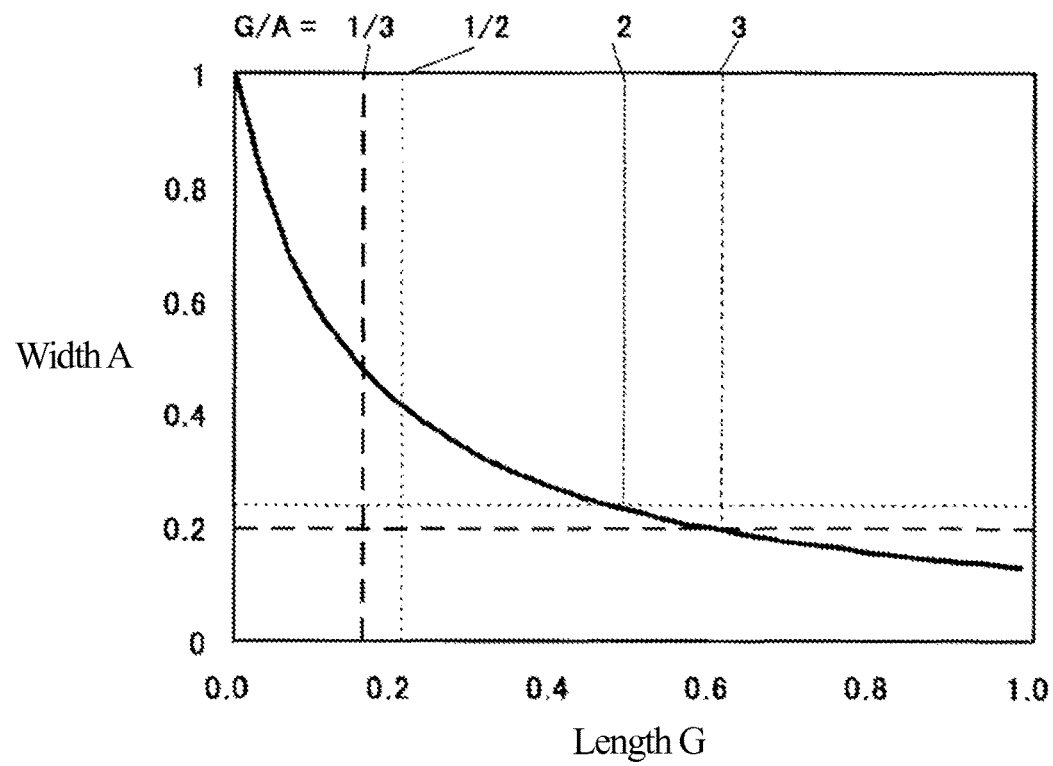
FIG. 9 is a graph illustrating a relation between a length G of the extension section in FIG. 7A and a width A of the extension section.
Figure 10:
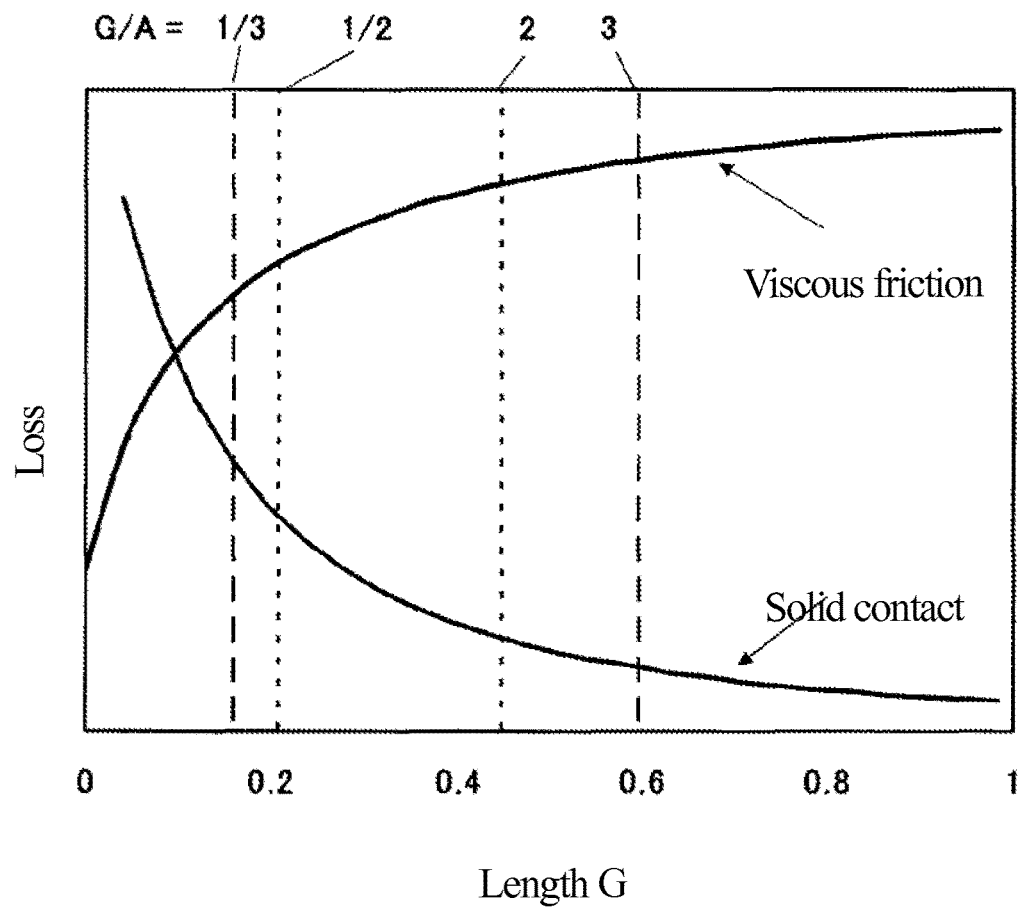
FIG. 10 is a graph illustrating the relation between the length G of the extension section in FIG. 7A and loss.

Specifically, FIG. 9 is a graph illustrating the relation between the length G and the width A of the extension section 162 when the upper portion I at the front end of the seal section 160 and the lower portions J and K at the rear end of the extension section 162 contact the inner peripheral face of the cylinder 134. A horizontal axis indicates the length G of the extension section 162 with respect to the diameter of the piston 136. A vertical axis indicates the width A of the extension section 162 with respect to the diameter of the piston 136. FIG. 10 is a graph illustrating the relation between the length G of the extension section 162 and loss. A horizontal axis indicates the length G of the extension section 162 with respect to the diameter of the piston 136. A vertical axis indicates viscous friction (viscous resistance) occurring with the reciprocation of the piston 136, and an energy loss (sliding loss) due to solid contact.

As illustrated in FIG. 9, when the upper portion I and the lower portions J, K contact the inner peripheral face of the cylinder 134, as the length G of the extension section 162 is longer, the width A of the extension section 162 is smaller. Thus, the extension sections 162 cannot sufficiently support the load exerted on the piston 136 and as illustrated in FIG. 10, as the length G of the extension section 162 is longer, the energy loss due to viscous friction becomes larger.

On the other hand, when the length G of the extension section 162 is small, the extension section 162 is not arranged on a part of the piston 136 sandwiching the piston 143, which is the action point of the load, from the right side and the left side. Thus, the extension section 162 cannot sufficiently support the load in the transverse direction, so that the piston 136 directly contacts the inner peripheral face of the cylinder 134 without interposing the lubricating oil 104. As a result, as illustrated in FIG. 10, solid contact between the piston 136 and the inner peripheral face of the cylinder 134 increases, thereby raising the energy loss.

On the contrary, by setting the length G of the extension section 162 with respect to the width A of the extension section 162 as described above ((⅓)≤(G/A)≤3), an increase in the energy loss due to viscous friction and solid contact can be suppressed. Accordingly, the sliding loss of the piston 136 can be reduced.

The electric element 110 is driven with a plurality of rotation speeds by the inverter circuit. Accordingly, vibration generated when the electric element 110 is driven with a low rotation speed and the load applied to the piston 136 with the inertial force generated when the electric element 110 is driven with a high rotation speed may increase. To counteract this, by providing the seal section 160, the extension sections 162, and the capture section 164 in the piston 136, the weight of the piston 136 is reduced. Accordingly, the vibration and the load can be reduced.

(Embodiment 2)

Figure 11:
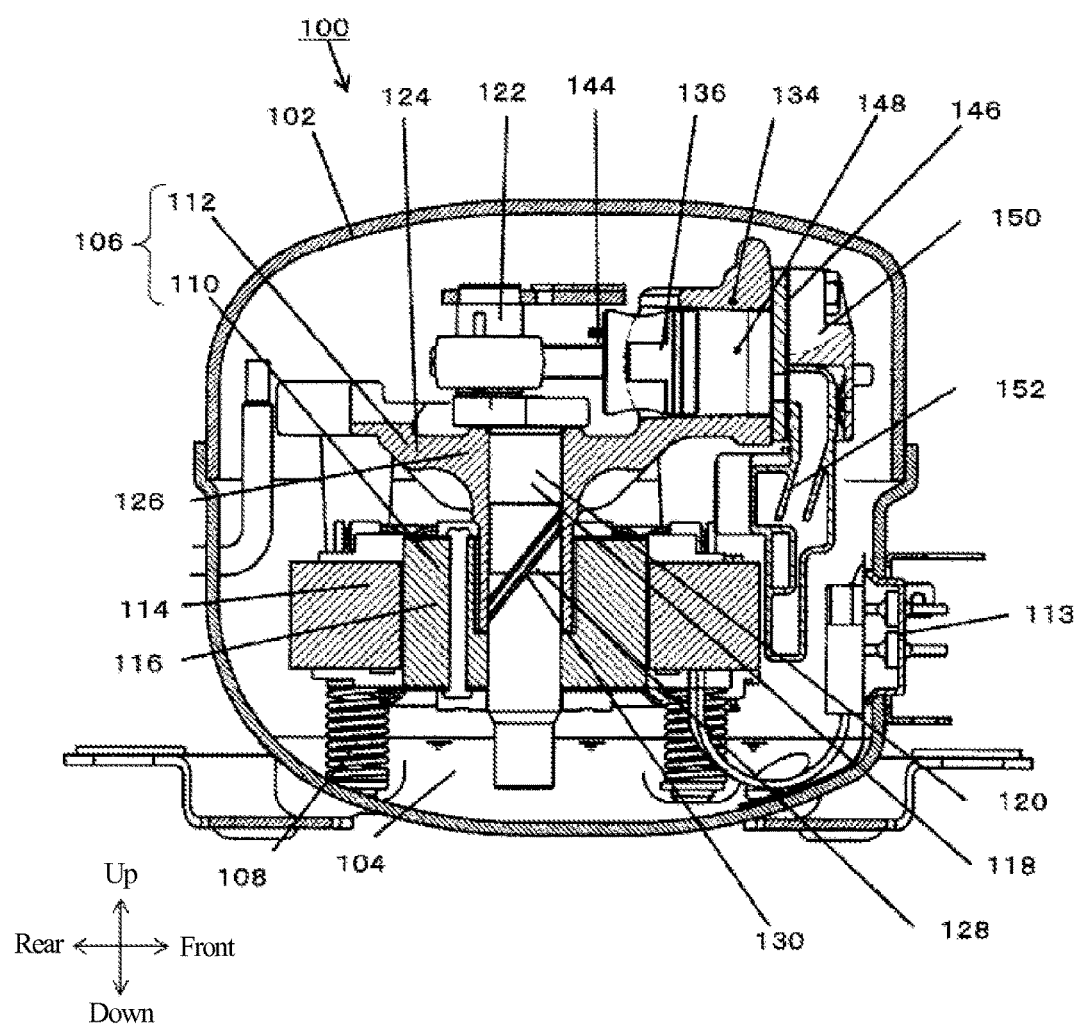
FIG. 11 is a sectional view illustrating a hermetic compressor in Embodiment 2 of the present invention.
Figure 12:
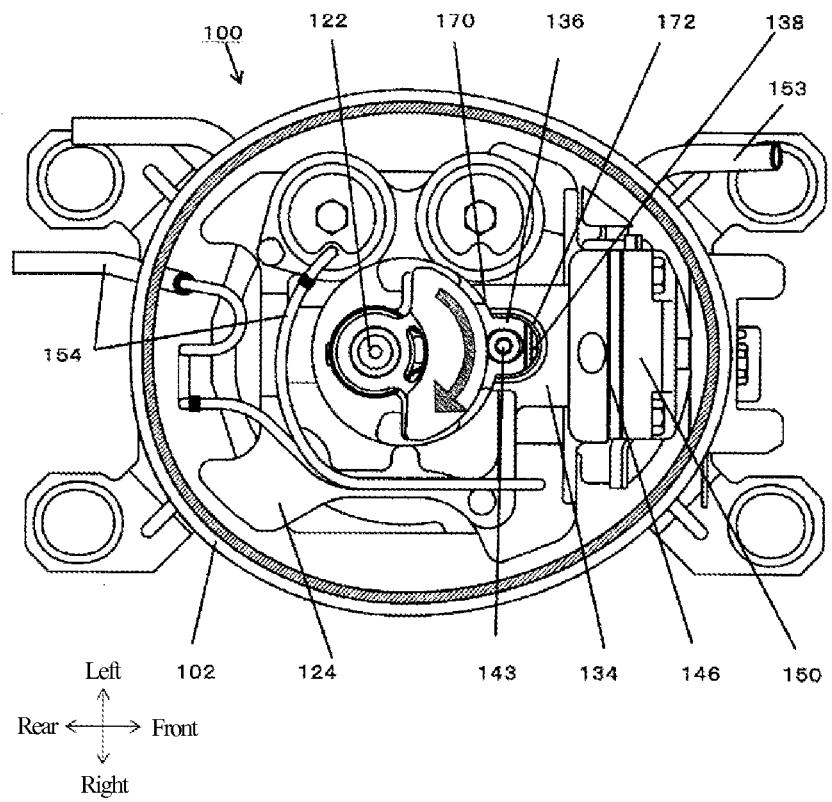
FIG. 12 is a sectional view illustrating the hermetic compressor taken along the direction vertical to a principal shaft in FIG. 11.
Figure 13A:
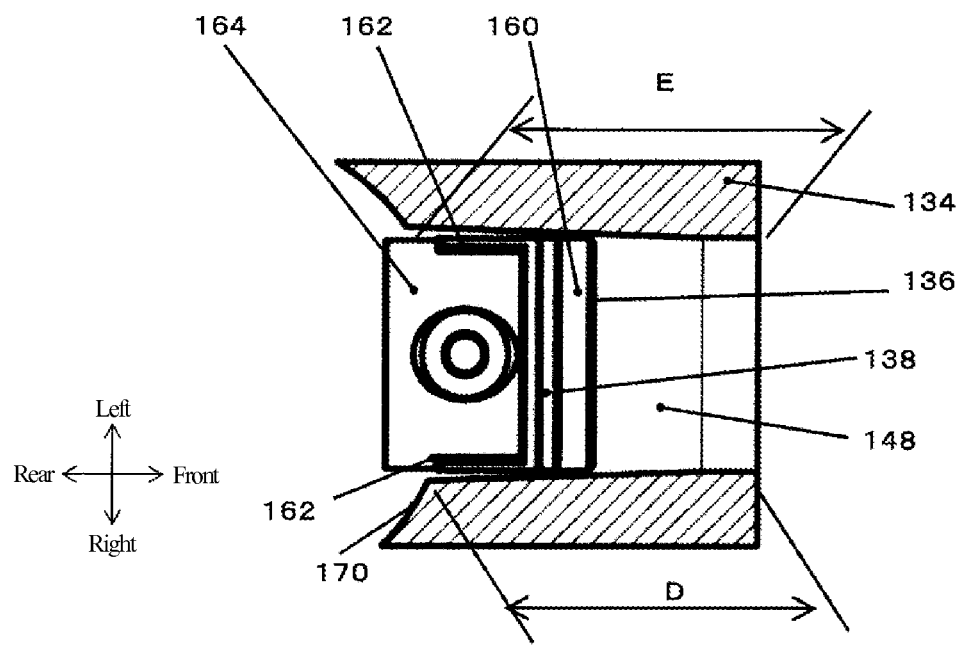
FIG. 13A is a view illustrating a piston inserted into a cylinder in FIG. 11 when viewed from above.
Figure 13B:
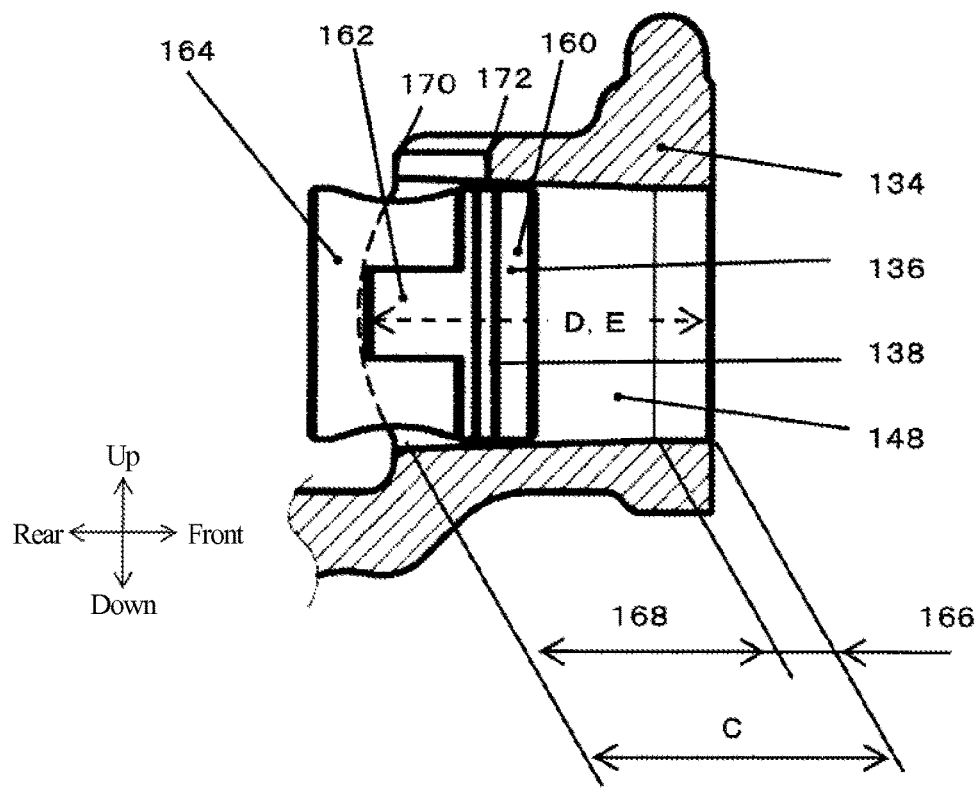
FIG. 13B is a view illustrating the piston inserted into the cylinder in FIG. 11 when viewed from right.

FIG. 11 is a sectional view illustrating a hermetic compressor 100 in Embodiment 2. FIG. 12 is a sectional view illustrating the hermetic compressor 100 taken along a direction vertical to the principal shaft 120 in FIG. 11. FIG. 13A is a view illustrating a piston 136 inserted into a cylinder 134 when viewed from above. FIG. 13B is a view illustrating the piston 136 inserted into the cylinder 134 when viewed from right. In FIG. 13A and FIG. 13B, to clarify the positional relation between the cylinder 134 and the piston 136, the cylinder 134 is cut along its central axis.

As illustrated in FIG. 12 and FIG. 13A, the rear end 170 of the cylinder 134 is formed of a circular arc curved using the axis of the principal bearing 126 (FIG. 11) as the center. The rear end 170 is recessed forward, and thereby the shaft 118 and the connection section 144 are prevented from hitting against the cylinder 134.

As illustrated in FIG. 13A and FIG. 13B, the cylinder 134 includes a straight section 166 and a tapered section 168. Thus, at least a part of the inner peripheral face of the cylinder 134 is tapered such that the radius is larger on the bottom dead center side of the piston 136 (inner peripheral face of the cylinder 134 on the rear side) than on the top dead center side of the piston 136 (the inner peripheral face of the cylinder 134 on the front side). The straight section 166 is provided on the front side of the cylinder 134, and the diameter of the inner peripheral face of the cylinder 134 is constant without varying in the axial direction. The tapered section 168 is provided in the rear of the straight section 166, and the diameter of the inner peripheral face of the cylinder 134 expands toward the rear side. For example, the diameter at the rear end of the tapered section 168 is larger than the diameter of the straight section 166 by about 20 to 30 μm.

Because the gap between the inner peripheral face of the straight section 166 and the piston 136 is small, hermeticity of the compression chamber 148 can be kept. Meanwhile, because the gap between the inner peripheral face of the tapered section 168 and the piston 136 is large, viscous friction can be made small to decrease the sliding loss of the piston 136.

The axial length of the inner peripheral face of the cylinder 134 is larger in the portions opposed to the extension sections 162 than in the other portion. That is, a length D on the right side and a length E on the left side of the inner peripheral face of the cylinder 134 each are longer than a lower length C. The length D on the right side and the length E on the left side are set such that the extension sections 162 are located in the columnar inner space of the cylinder 134 when the piston 136 is located at the bottom dead center.

For this reason, even when the piston 136 is located at the bottom dead center, the extension sections 162 are not exposed outside of the cylinder 134. Thus, it is not necessary to make the length G of the extension section 162 extremely small such that the extension sections 162 of the piston 136 do not protrude from the cylinder 134. Thus, the extension sections 162 can bear the load exerted on the piston 136 in the transverse direction at all times. Further, because the extension sections 162 do not pass the rear end of the cylinder 134, a damage of the extension section 162 by passage, an increase in friction and wear, noise due to collision, peeling of surface treatment from the piston 136 can be prevented.

Even when the extension sections 162 are made longer, it is not necessary to make the entire cylinder 134 longer such that the extension sections 162 do not protrude from the cylinder 134. Therefore, the necessary length of the extension section 162 can be ensured while an increase in the size of the cylinder block 124 is suppressed.

The outer peripheral face of the piston 136 is treated with synthetic resin. Suitable resins in terms of heat resistance, chemical resistance, and load bearing strength at sliding such as so-called engineering plastics may be used as the synthetic resin. Examples of the engineering plastics include polytetrafluoroethylene (PTFE), polyamide imide (PAT) containing a solid lubricant such as graphite and molybdenum disulfide, and polyether ether ketone (PEEK). The surface treatment can improve the durability of the piston 136 to make the sliding area small, thereby reducing the sliding loss. Further, even when the pressure of the side face of the piston 136 increases with a high load, a damage of the piston 136 can be prevented.

Figure 14:
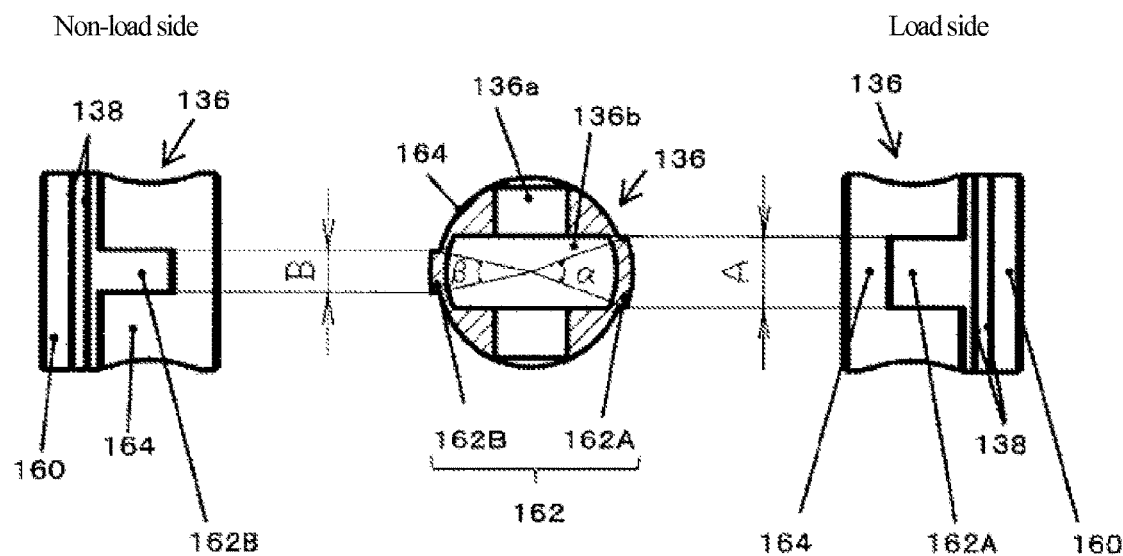
FIG. 14 is a view illustrating the piston in FIG. 11.

FIG. 14 illustrates the piston 136. The right side in FIG. 14 illustrates the piston 136 when viewed from right. The left side in FIG. 14 illustrates the piston 136 when viewed from left. The center in FIG. 14 is a sectional view illustrating the piston 136.

As illustrated in FIG. 14, the two extension sections 162 have different widths. Specifically, when the eccentric shaft 122 rotates in a direction represented by an arrow in FIG. 12, the connection section 144 applies a force (load) to press the piston 136 onto the inner peripheral face of the cylinder 134. This load is exerted onto the right side of the piston 136 when the piston 136 moves from the bottom dead center toward the top dead center. A direction in which the piston 136 is pressed to the inner peripheral face of the cylinder 134 side with the load is referred to as a load side, and an opposite direction to the load side is referred to as non-load side.

As illustrated in FIG. 14, the extension section 162 located on the load side is referred to as a first extension section 162A, and the extension section 162 located on the non-load side is referred to as a second extension section 162B. A central angle $\alpha$ of the first extension section 162A is larger than a central angle $\beta$ of the second extension section 162B. For example, the central angle $\alpha$ of the first extension section 162A is 42 degrees, and the central angle $\beta$ of the second extension section 162B is 26 degrees. A width A of the first extension section 162A is larger than a width B of the second extension section 162B. For example, the width A is 1.2 times or more and twice or less of the width B, preferably, 1.6 times as much as the width B.

Figure 15:
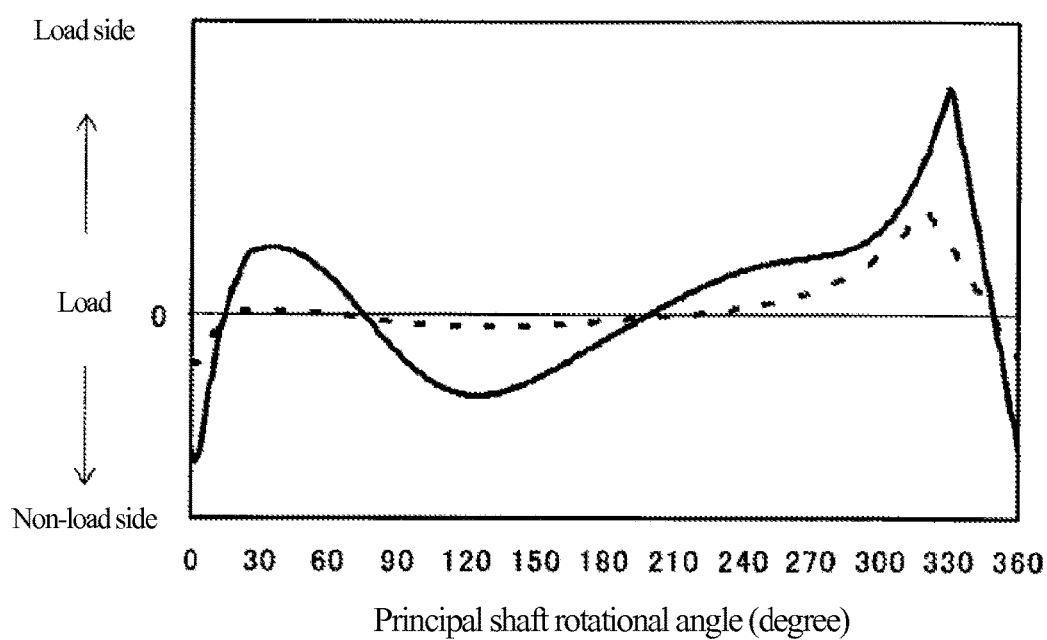
FIG. 15 is a graph illustrating a load exerted on the piston when a principal shaft in FIG. 11 makes one revolution.

FIG. 15 is a graph illustrating the load exerted on the piston 136 when the principal shaft 120 makes one revolution. A horizontal axis indicates the rotational angle of the principal shaft 120. A vertical axis indicates the load applied to portion of the piston 136 on the load side and the portion of the piston 136 on the non-load side. A solid line indicates the load in the high operating pressure and high rotation speed condition. A broken line indicates the load in the normal operating pressure and low rotation speed condition.

The loads applied to the load side portion and the non-load side portion of the piston 136 vary depending on the operating pressure, the rotational speed, the mass of the components such as the piston 136, and an axial offset of the cylinder 134 and the principal bearing 126. However, as illustrated in FIG. 15, the load applied to the load side portion is generally larger than the load applied to the non-load side portion. When represented by a solid line, a ratio of the maximum load on the load side portion to the maximum load on the non-load side portion is about 1.6:1.

In this connection, the width A of the first extension section 162A is set to be larger than the width B of the second extension section 162B. For this reason, even when the load on the load side portion is larger than the load on the non-load side portion, the surface pressure of the first extension section 162A can be made equal to the surface pressure of the second extension section 162B. Thereby, the extension sections 162A, 162B can sufficiently support the piston 136 while reducing the area of the extension sections 162A, 162B as much as possible. Accordingly, the sliding loss can be reduced.

(Embodiment 3)

Figure 16:
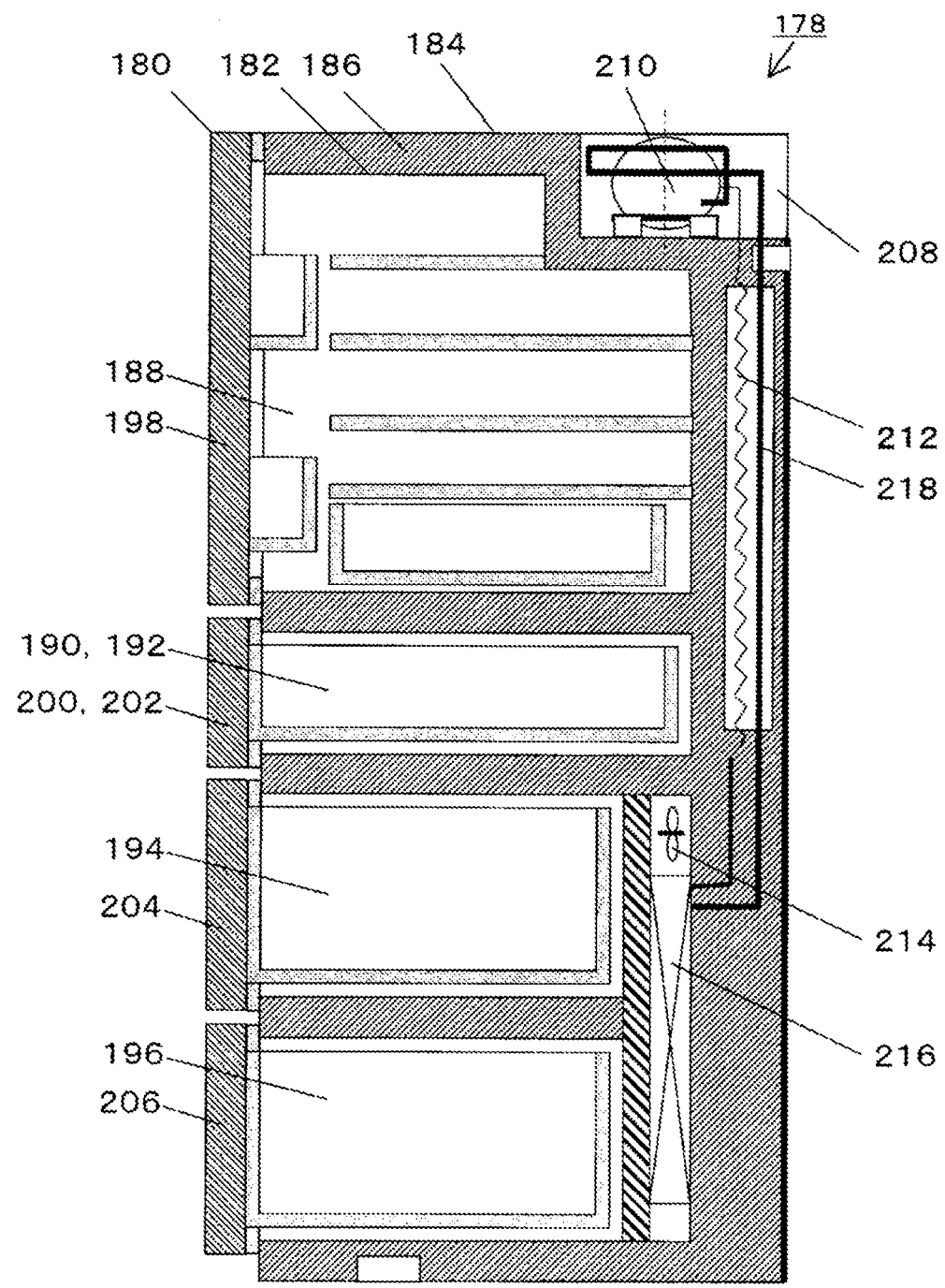
FIG. 16 is a sectional view illustrating a refrigerator in Embodiment 3 of the present invention.

FIG. 16 is a sectional view illustrating a refrigerator 178. In this embodiment, the refrigerator 178 is provided with a hermetic compressor 210 that is the hermetic compressor 100 in Embodiment 1. However, the refrigerator 178 may be provided with the hermetic compressor 210 that is the hermetic compressor 100 in Embodiment 2. In this case, the same actions and effects as those in Embodiment 2 can be achieved.

As illustrated in FIG. 16, the refrigerator 178 includes a thermal insulating housing 180 having a thermal insulating space, and a door attached to the thermal insulating housing 180 so as to open/close the thermal insulating space. The face of the thermal insulating housing 180, to which the door is attached, is referred to as front face, and the face opposed to the front face is referred to as back face.

The thermal insulating housing 180 is substantially shaped like an oblong rectangular parallelepiped, and includes a thermal insulating wall having a thermal insulating space therein, and partition plates that partition the thermal insulating space into a plurality of (five in this embodiment) thermal insulating spaces 188, 190, 192, 194, and 196. The five thermal insulating spaces 188, 190, 192, 194, and 196 are divided into four stages in the vertical direction, the thermal insulating spaces in the second stage from the top are further divided into two in the transverse direction. For example, the thermal insulating spaces in the first stage from the top is used as a cooling chamber 188, the two thermal insulating spaces in the second stage from the top are used as a switch chamber 190 and an ice making chamber 192, the thermal insulating space in the third stage is used as a vegetable chamber 194, and the thermal insulating space in the fourth stage is used as a freezing chamber 196. The thermal insulating spaces 188, 190, 192, 194, and 196 are interconnected via a duct (not shown), and the duct is provided with a damper (not shown). Air can move between the thermal insulating spaces through the duct, and the amount of the air is adjusted by the damper. A temperature sensor (not shown) is arranged at all or some thermal insulating spaces 188, 190, 192, 194, and 196.

The thermal insulating housing 180 includes an inner box 182 and an outer box 184 provided on the outer side of the inner box 182. The inner box 182 is formed by vacuum molding of a resin such as ABS. The inner box 182 forms an inner face of the thermal insulating wall that defines the thermal insulating space, and the partition plate. The outer box 184 is made of a metal material such as a precoat steel plate, and forms an outer face of the thermal insulating wall. A space between the inner box 182 and the outer box 184 is integrally foam-filled with a thermal insulating body 186 to produce the thermal insulating housing 180. Thereby, the thermal insulating wall and the partition plate are integrally formed at the same time. The thermal insulating body 186 is made of, for example, foam plastics such as rigid polyurethane foam, phenolic foam, or styrene foam. In terms of the prevention of warming, for example, hydrocarbon-based cyclopentane is used as the foam material.

The thermal insulating housing 180 is provided with a recess 208 formed by partially denting the back face and the upper face of the thermal insulating housing 180, and the hermetic compressor 210 is elastically supported by the recess 208. A condenser (not shown) and a drier (not shown) for removing moisture are disposed on the side face of the thermal insulating housing 180. A capillary 212 as a decompressor and an evaporator 216 are disposed on the back face of the thermal insulating housing 180. A cooling fan 214 and an evaporator 216 are disposed on the back faces of the vegetable chamber 194 and the freezing chamber 196 in the thermal insulating housing 180. The hermetic compressor 210, the condenser, the capillary 212, and the evaporator 216 are annularly interconnected via a pipe 218 to form a refrigeration cycle. The thermal insulating housing 180 is provided with a control device (not shown), and a temperature sensor disposed in each thermal insulating space is connected to the control device. The hermetic compressor 210, the condenser, the drier, the capillary 212, the evaporator 216, the cooling fan 214, and the evaporator 216 are connected to the control device. The control device controls these parts according to a detected value of the temperature sensor.

In this embodiment, five doors 198, 200, 202, 204, and 206 are attached to the thermal insulating housing 180 so as to openably cover the front faces of the thermal insulating spaces 188, 190, 192, 194, and 196 in the thermal insulating housing 180. The cooling chamber 188 has the rotating door 198, and the switch chamber 190, the ice making chamber 192, the vegetable chamber 194, and the freezing chamber 196 have the drawing doors 200, 202, 204, and 206, respectively. The rotating door 198 and the drawing doors 200, 202, 204, and 206 are each formed by sticking a decorative panel to a heat insulating material such as styrofoam. A gasket is disposed between each of the doors 198, 200, 202, 204, and 206, and the thermal insulating housing 180 to ensure air tightness of the thermal insulating spaces 188, 190, 192, 194, and 196.

Next, the operations in the refrigeration cycle of the refrigerator 178 will be described. The control device starts and stops a cooling operation according to a detection signal of each temperature sensor. At start of the cooling operation, an operating fluid is compressed by reciprocation of the piston 136 (FIG. 1) in the hermetic compressor 210, and thereby the operating fluid becomes high-temperature and high-pressure and is sent from the ejection tube 154 to the refrigeration cycle through the pipe 218.

When heat is radiated in the condenser, the high-temperature and high-pressure gaseous operating fluid condenses into liquid. The liquid operating fluid is decompressed by the capillary 212, becomes low-temperature and low-pressure, and reaches the evaporator 216. Here, the cooling fan 214 moves air in the vegetable chamber 194 and the freezing chamber 196, and the air exchanges heat with the low-temperature operating fluid in the evaporator 216. As a result, the high-temperature operating fluid vaporizes and returns to the hermetic compressor 210 through the pipe 218. Meanwhile, the cooled air is distributed to the thermal insulating spaces 188, 190, 192 through the duct. At this time, the flow rate of the air distributed to the thermal insulating spaces 188, 190, 192 is adjusted by using the damper and hence the thermal insulating spaces 188, 190, 192 are adjusted to have a suitable temperature.

For example, for cold storage, the cooling chamber 188 is adjusted to have a non-freezing temperature, for example, 1° C. to 5° C. The switch chamber 190 is set to have a temperature that can be changed by the user, that is, a set temperature. The set temperature can be set to a predetermined temperature in a range from a temperature range of the freezing chamber 196 to a temperature range of the vegetable chamber 194 for cold storage. The ice making chamber 192 has an automatic ice maker (not shown) to automatically produce and accommodate the ice. For the purpose of storing ice, the temperature range of the ice making chamber 192 is set to be relatively higher than the temperature range for refrigeration, for example, the temperature range of −18° C. to −10° C. The temperature range of the vegetable chamber 194 is set to be equal to or slightly higher than the temperature range of the cooling chamber 188, for example, 2° C. to 7° C. When the temperature is enough low so as not to freeze green vegetables in the vegetable chamber 194, freshness of the green vegetables can be kept for a long time. The freezing chamber 196 is set to have a temperature of −22 to −18° C. for refrigerated storage. However, to improve refrigerated storage, the freezing chamber 196 may be set to have a lower temperature of −30° C. or −25° C.

In the operations of the refrigeration cycle, in the hermetic compressor 210, the piston 136 having the seal section 160, the extension section 162, and the capture section 164 reciprocates in the columnar inner space of the cylinder 134. Thus, the piston 136 has improved lubricity and compression efficiency, and reduced sliding loss. Accordingly, power consumption and reliability of the refrigerator 178 can be improved.

In the thermal insulating housing 180, the partition plate is foam-filled integrally with the thermal insulating wall, reducing costs and improving the thermal insulating property. The partition plate thus produced has a twice thermal insulating property as high as the styrofoam insulating member and thus, can be reduced in thickness to increase the thermal insulating space.

(Other Embodiments)

In Embodiment 1, the piston 136 may be subjected to the surface treatment in Embodiment 2. In Embodiment 1, the inner peripheral face of the cylinder 134 may be tapered as in Embodiment 2. In Embodiment 1, as in Embodiment 2, the width of the extension section 162 on the load side may be larger than the width on the non-load side. In Embodiment 1, as in Embodiment 2, the length of the inner peripheral face of the cylinder 134, which is opposed to the extension section 162, may be larger than the length of the remaining portion.

In Embodiment 2, the corners of the extension section 162 and the seal section 160 may be formed of the rounded sections 161 in Embodiment 1. In Embodiment 2, the lubricating oil lead-in section 163 in Embodiment 1 may be provided between the extension section 162 and the capture section 164. In Embodiment 2, the stepped section 164a in Embodiment 1 may be provided at the rear end of the capture section 164.

Although the partition plate is integral with the thermal insulating wall in the thermal insulating housing 180 in Embodiment 3, the partition plate may be separated from the thermal insulating wall. Although the hermetic compressor 100 is provided in the refrigerator 178 in Embodiment 3, the hermetic compressor 100 may be used in equipment using the refrigeration cycle (heat pump cycle), such as air conditioners and vending machines

INDUSTRIAL APPLICABILITY

The hermetic compressor and the refrigerator of the present invention are useful as the hermetic compressor and the refrigerator that can to improve lubricity and compression efficiency, and reduce the sliding loss.

REFERENCE SIGNS LIST 100 hermetic compressor
102 hermetic container
104 lubricating oil
110 electric element
112 compression element
114 stator
116 rotor
120 principal shaft
122 eccentric shaft 118 shaft
124 cylinder block
126 principal bearing
130 oil supply mechanism
134 cylinder
136 piston
138 annular groove
144 connection section
148 compression chamber
160 seal section
162 extension section
164 capture section
170 end face
210 hermetic compressor

The invention claimed is:

1. A hermetic compressor comprising:
an electric element including a stator and a rotor that rotates relative to the stator;
a compression element driven by the electric element; and
a hermetic container that stores the electric element and the compression element, and accommodates lubricating oil, wherein
the compression element includes:
a shaft including a principal shaft to which the rotor is fixed and an eccentric shaft that is eccentric with respect to the principal shaft;
a cylinder block including a bearing that rotatably supports the principal shaft and a cylinder having an inner space;
a piston that reciprocates in the inner space; and
a connection section that couples the piston to the eccentric shaft, and the piston includes:
a seal section in sliding contact with an inner peripheral face of the cylinder;
two extension sections that have respective circular arc faces having the same radius as a radius of the seal section, are spaced in the circumferential direction, and extend from the seal section toward a crank shaft side in the axial direction; and
a capture section that further extends toward the crank shaft side than the extension sections, the capture section including a portion formed around the entire circumference of the piston and having a radius that is smaller than the radius of the seal section.

2. The hermetic compressor according to claim 1, wherein when the piston is located at a bottom dead center, at least a part of the capture section is exposed outside of the cylinder.

3. The hermetic compressor according to claim 1, wherein an axial length of each respective extension section of the two extension sections is within a range of one third to three times of a circumferential width of the respective extension section.

4. The hermetic compressor according to claim 3, wherein a length of each respective extension section of the two extension sections is equal to the width of the respective extension section.

5. The hermetic compressor according to claim 1, further comprising a pin that connects the connection section to the piston, wherein
a length of each respective extension section of the two extension sections is within a range of one half to three over two of a diameter of the pin.

6. The hermetic compressor according to claim 1, wherein
a length of each respective extension section of the two extension sections is larger than a length of the seal section, and
a central angle of a circular arc of each respective extension section of the two extension sections is within a range of 40 degrees to 90 degrees.

7. The hermetic compressor according to claim 1, wherein
a direction in which the piston is pushed toward the inner peripheral face of the cylinder by the connection section when the piston moves toward a top dead center is a load side, and a direction opposite to the load side is a non-load side,
a width of one extension section of the two extension sections, which is located on the load side, is 1.2 times as much as a width of the other extension section located on the non-load side.

8. The hermetic compressor according to claim 1, wherein the piston further includes a lubricating oil lead-in section formed as an inclined face between each respective extension section of the two extension sections and the capture section.

9. The hermetic compressor according to claim 1, wherein
a corner that connects a circumferential edge of each respective extension section of the two extension sections to an edge on the crank shaft side of the seal section is a rounded section curved like a circular arc.

10. The hermetic compressor according to claim 9, wherein
a radius of the rounded section is within a range of 25% to 50% of a width of each respective extension section of the two extension sections.

11. The hermetic compressor according to claim 1, wherein
the seal section is provided with an annular groove.

12. The hermetic compressor according to claim 1, wherein
the piston is subjected to a surface treatment with a synthetic resin.

13. The hermetic compressor according to claim 1, wherein
an axial length of a portion of the inner peripheral face of the cylinder, which is opposed to a respective extension section of the two extension sections, is larger than a remaining portion of the inner peripheral face.

14. The hermetic compressor according to claim 1, wherein
at least a part of the inner peripheral face of the cylinder is tapered such that a radius on the crank shaft side is larger than a radius on a load side.

15. The hermetic compressor according to claim 1, wherein
the electric element is driven by an inverter circuit with a plurality of rotation speeds.

16. A refrigerator comprising the hermetic compressor according to claim 1.

* * * * *